United States Patent
Cioffi et al.

(10) Patent No.: US 7,110,370 B2
(45) Date of Patent: *Sep. 19, 2006

(54) METHOD AND APPARATUS FOR COORDINATING MULTI-POINT TO POINT COMMUNICATIONS IN A MULTI-TONE DATA TRANSMISSION SYSTEM

(75) Inventors: John M. Cioffi, Cupertino, CA (US); John Bingham, Palo Alto, CA (US); Krista S. Jacobsen, Mountain View, CA (US)

(73) Assignee: Texas Instruments Incorporated, Dallas, TX (US)

( * ) Notice: Subject to any disclaimer, the term of this patent is extended or adjusted under 35 U.S.C. 154(b) by 562 days.

This patent is subject to a terminal disclaimer.

(21) Appl. No.: 10/052,964

(22) Filed: Jan. 17, 2002

(65) Prior Publication Data

US 2002/0122437 A1   Sep. 5, 2002

Related U.S. Application Data

(62) Division of application No. 08/913,210, filed on Oct. 22, 1997, now Pat. No. 6,473,438.

(51) Int. Cl.
*H04J 1/02* (2006.01)
*H04J 3/06* (2006.01)
*H04Q 7/00* (2006.01)

(52) U.S. Cl. .................... 370/280; 370/329; 370/468; 370/480

(58) Field of Classification Search ........... 370/280, 370/281, 294, 295, 329, 343, 345, 349, 350, 370/468, 480, 482, 484, 485, 489, 503, 509, 370/525, 528; 375/356; 379/93.01, 93.08, 379/93.26, 93.28; 455/3.1, 5.1, 507, 509, 455/512, 517

See application file for complete search history.

(56) References Cited

U.S. PATENT DOCUMENTS 4,256,925 A    3/1981   Goode (Continued)

FOREIGN PATENT DOCUMENTS

EP    0295227 A1    12/1988

(Continued)

OTHER PUBLICATIONS

Bingham, John A.C., "Multicarrier Modulation For Data Transmission—An Idea Whose Time Has Come," IEEE Communications Magazine, May 1990.

*Primary Examiner*—Alpus H. Hsu
(74) *Attorney, Agent, or Firm*—Steven A. Shaw; W. James Brady; Frederick J. Telecky, Jr.

(57) ABSTRACT

A variety of bidirectional data transmission systems that facilitate communications between a plurality of remote units (15) and a central unit (10) using a frame based discrete multi-carrier transmission scheme are disclosed. In each of the systems, frames transmitted from the plurality of remote units (15) are synchronized at the central unit (10). A variety of novel modem arrangements and methods for coordinating communications between a plurality of remote units (15) and a central unit (10) to facilitate multi-point-to-point transmission are disclosed. The invention has application in a wide variety of data transmission schemes including Asymmetric Digital Subscriber Line systems that includes the transmission of signals over twisted pair, fiber and/or hybrid telephone lines, cable systems that includes the transmission of signals over a coaxial cable, and digital cellular television systems that include the transmission of radio signals.

5 Claims, 9 Drawing Sheets

U.S. PATENT DOCUMENTS

| | | | |
|---|---|---|---|
| 4,314,376 A | | 2/1982 | Williams |
| 4,438,511 A | | 3/1984 | Baran |
| 4,528,656 A | | 7/1985 | Morais |
| 4,601,045 A | | 7/1986 | Lubarsky |
| 4,606,023 A | | 8/1986 | Dragoo |
| 4,644,534 A | * | 2/1987 | Sperlich .................... 370/347 |
| 4,773,065 A | | 9/1988 | Koyobashi et al. |
| 4,835,764 A | * | 5/1989 | Sulzbacher et al. ........ 370/294 |
| 4,870,408 A | | 9/1989 | Zdunek et al. |
| 4,914,651 A | | 4/1990 | Lusignan |
| 5,043,982 A | | 8/1991 | Werner |
| 5,072,445 A | | 12/1991 | Nawata |
| 5,148,272 A | | 9/1992 | Acampora et al. |
| 5,177,739 A | | 1/1993 | Basnuevo et al. |
| 5,272,700 A | | 12/1993 | Hansen et al. |
| 5,285,474 A | | 2/1994 | Chow et al. |
| 5,291,289 A | | 3/1994 | Hulyalkar et al. |
| 5,293,633 A | | 3/1994 | Robbins |
| 5,317,571 A | | 5/1994 | Marcel et al. |
| 5,400,322 A | * | 3/1995 | Hunt et al. ................ 370/468 |
| 5,440,561 A | | 8/1995 | Werronen |
| 5,471,473 A | | 11/1995 | Tejima |
| 5,519,731 A | * | 5/1996 | Cioffi ........................ 375/260 |
| 5,557,612 A | | 9/1996 | Bingham |
| 5,625,651 A | | 4/1997 | Cioffi |
| 5,644,573 A | | 7/1997 | Bingham et al. |
| 5,680,394 A | * | 10/1997 | Bingham et al. ........... 370/294 |
| 5,781,728 A | * | 7/1998 | Rybicki et al. ............. 709/230 |
| 5,838,667 A | * | 11/1998 | Bingham et al. ........... 370/294 |
| 5,909,463 A | * | 6/1999 | Johnson et al. ............ 375/220 |
| 5,963,557 A | * | 10/1999 | Eng .......................... 370/432 |
| 5,982,784 A | * | 11/1999 | Bell .......................... 370/485 |
| 6,160,820 A | * | 12/2000 | Isaksson et al. ............ 370/480 |
| 6,246,695 B1 | * | 6/2001 | Seazholtz et al. ........... 370/468 |

FOREIGN PATENT DOCUMENTS

| | | |
|---|---|---|
| EP | 0562868 A2 | 9/1993 |
| WO | WO 85/03180 | 7/1985 |
| WO | WO 92/10884 | 6/1992 |

* cited by examiner

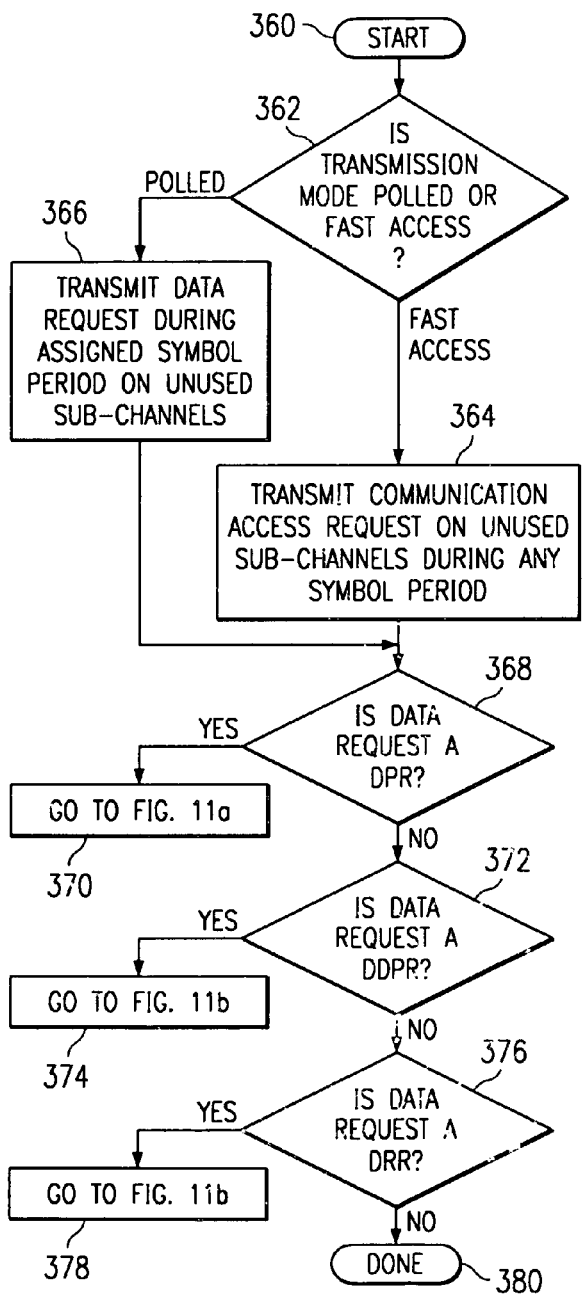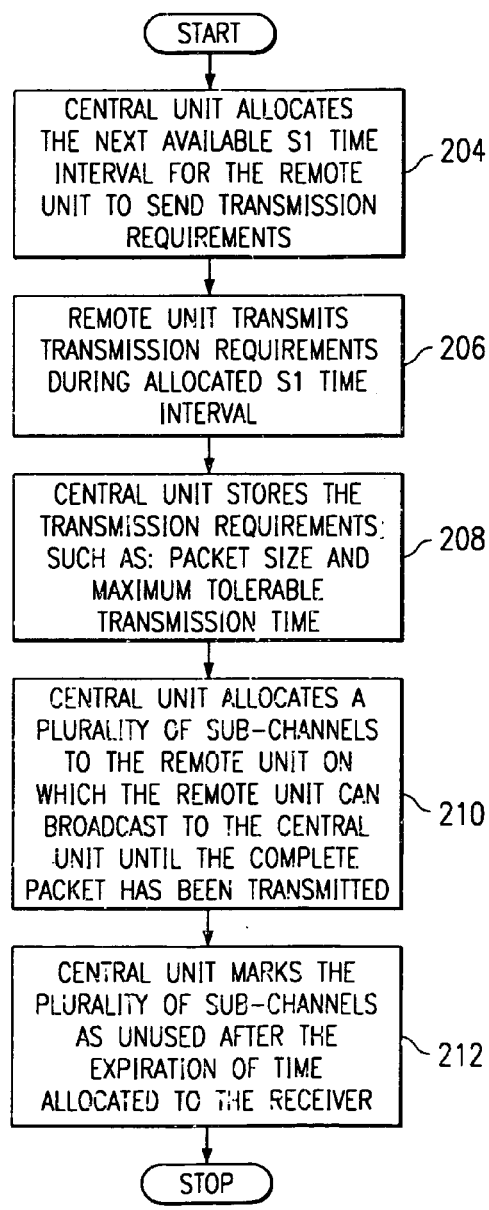

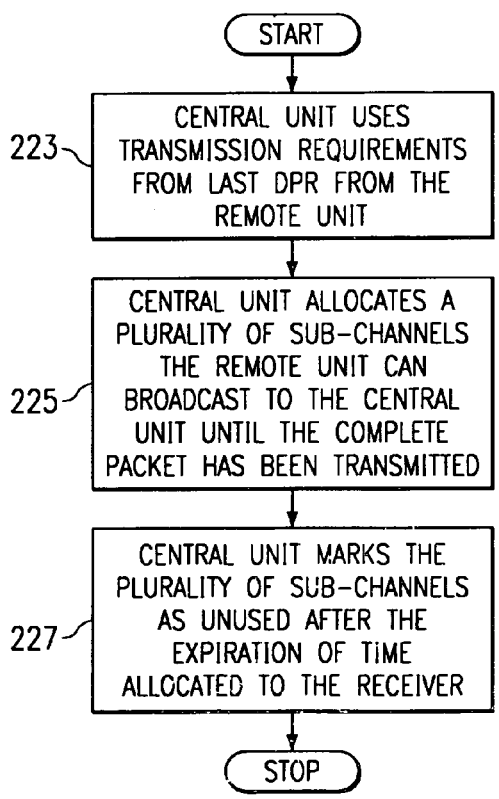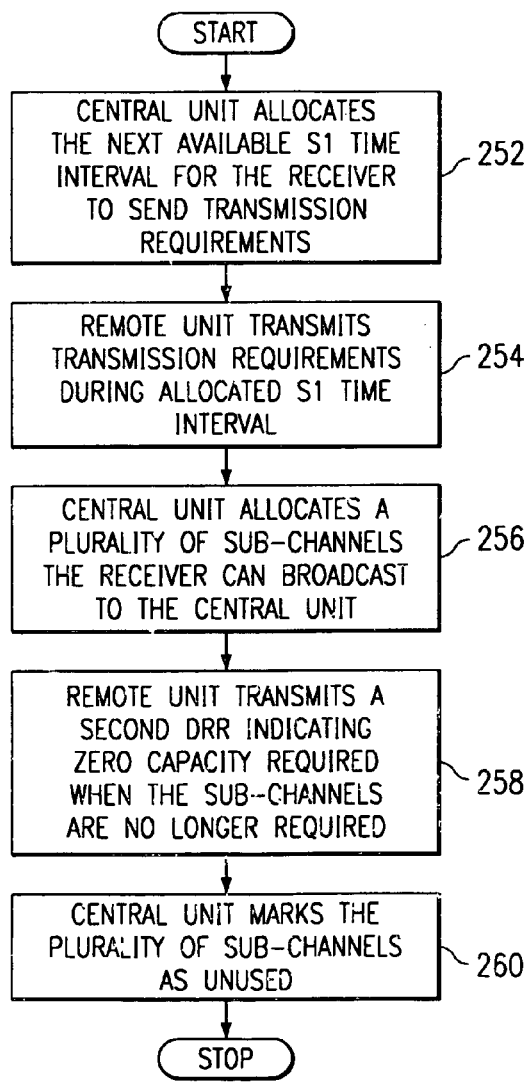

METHOD AND APPARATUS FOR COORDINATING MULTI-POINT TO POINT COMMUNICATIONS IN A MULTI-TONE DATA TRANSMISSION SYSTEM

CROSS-REFERENCE TO RELATED APPLICATIONS

This is a divisional of U.S. application Ser. No. 08/913,210, filed Oct. 22, 1997, which is a U.S. national stage application based on International Patent Application PCT/US95/07035, filed Jun. 2, 1995, which issued as U.S. Pat. No. 6,473,438, and which is a continuation of U.S. applications: Ser. No. 08/396,132, filed Feb. 28, 1995, which issued as U.S. Pat. No. 5,557,612; Ser. No. 08/377,023, filed Jan. 20, 1995, which issued as U.S. Pat. No. 5,644,573; and Ser. No. 08/252,829, filed Jun. 2, 1994, which issued as U.S. Pat No. 5,625,651.

BACKGROUND OF THE INVENTION

The present invention relates generally to discrete multi-tone communication systems in which a central unit services a plurality of remote units. More specifically, it relates to methods for coordinating upstream communications from the remote units.

Discrete Multi-Tone (DMT) data transmission schemes have been shown to facilitate high performance data transmission. Among the benefits of DMT architectures is that they have high spectral efficiencies and can adaptively avoid various signal distortion and noise problems. Since they have very high data transmission capabilities, in most applications selection of a DMT data transmission scheme will provide plenty of room for the expansion of service as the demands on the data transmission system increase. Hence, discrete Multi-Tone technology has applications in a variety of data transmission environments. For example, the Alliance For Telecommunications Information Solutions (ATIS), which is a group accredited by the ANSI (American National Standard Institute) Standard Group, has finalized a discrete multi-tone based standard for the transmission of digital data over Asymmetric Digital Subscriber Lines (ADSL). The standard is intended primarily for transmitting video data over ordinary telephone lines, although it may be used in a variety of other applications as well. The North American Standard is referred to as the ANSI T1.413 ADSL Standard.

Transmission rates under the ADSL standard are intended to facilitate the transmission of information at rates of at least 6 million bits per second (i.e., 6+ Mbit/s) over twisted-pair phone lines. The standardized discrete multi-tone (DMT) system uses 256 "tones" or "sub-channels" that are each 4.3125 kHz wide in the forward (downstream) direction. In the context of a phone system, the downstream direction is generally considered transmissions from the central office (typically owned by the telephone company) to a remote location that may be an end-user (i.e., a residence or business user). In other systems, the number of tones used may be widely varied. However when IFFT modulation is done, typical values for the number of available sub-channels (tones) are integer powers of two, as for example, 128, 256, 512, 1024 or 2048 sub-channels.

The Asymmetric Digital Subscriber Lines standard also contemplates the use of a reverse signal at a data rate in the range of 16 to 800 Kbit/s. The reverse signal corresponds to transmission in an upstream direction, as for example, from the remote location to the central office. Thus, the term Asymmetric Digital Subscriber Line comes from the fact that the data transmission rate is substantially higher in the forward direction than in the reverse direction. This is particularly useful in systems that are intended to transmit video programming or video conferencing information to a remote location over the telephone lines. By way of example, one potential use for the systems allows residential customers to obtain video information such as movies over the telephone lines or cable rather than having to rent video cassettes. Another potential use is in video conferencing.

The discrete multi-tone (DMT) transmission scheme has the potential for use in applications well beyond data transmissions over telephone lines. Indeed, DMT can be used in a variety of other digital subscriber access systems as well. For example, it may be used in cable based subscriber systems (which typically use coaxial cable) and wireless subscriber systems such as digital cellular TV. In cable systems, a single central unit (central modem) is typically used to distribute digital signals to more than one customer, which means more than one remote unit (remote modem). While all of the remote modems can reliably receive the same digital signals, the upstream transmissions must be coordinated to prevent confusion at the central modem as to the source of the upstream signals. In some existing cable systems (which do not use discrete multi-tone transmission schemes), each remote unit is given a dedicated frequency band over which it is to communicate with the central station. However, such an approach is inherently an inefficient use of transmission bandwidth and typically requires the use of analog filters to separate transmissions from the various remote units. Other existing cable systems use a single wide band for all remote units, which use time division multiple access (TDMA) to access the upstream channel. This approach is inefficient because of the lower total capacity of the single channel and because of the time required for the accessing process. Stationary digital cellular transmission systems face similar obstacles. The ability to access the channel on both a time- and frequency-divided basis would more efficiently utilize the transmission channel. However, the inherent multiplexing nature of DMT has previously restricted its application to point-to-point transmission because transmissions from different sources must be synchronized for the all-digital multiplexing to function properly.

ADSL applications have the potential for a similar problem, although it is typically more limited in nature. Specifically, a single line may service a plurality of drop points at a particular billing address (which may typically be a home or an office). That is, there may be several telephone "jacks" through which the user may wish to receive signals. To facilitate service to multiple locations tacks) over a single line, the use of a master modem has been proposed to facilitate synchronization. However, this is perceived as being a relatively expensive and undesirable solution. Accordingly, would be desirable to provide a mechanism in discrete multi-tone data transmission systems that facilitates the synchronization of signals from a plurality of remotes so that a central unit can coordinate and reliably interpret signals sent from the remotes.

Another feature of transmission systems currently utilized for communications from a remote unit to a central unit is that they either transmit data at a designated maximum rate (frequency-division multiplexing), or they transmit data in packets of a particular size (time-based multiplexing). They do not permit both. This limits the efficiency of the use of the transmission channels. Accordingly, it would be desirable to provide a mechanism through which when necessary, a remote unit can specify a desire to transmit at a particular data rate and when the data rate is not a concern, the remote unit may indicate that it desires to transmit a designated amount of information.

SUMMARY OF THE INVENTION

To achieve the foregoing and other objects and in accordance with the purpose of the present invention, a number of bi-directional data transmission systems that facilitate communications between a plurality of remote units and a central unit using a frame based discrete multi-carrier transmission scheme are disclosed. In each of the systems, frames transmitted from the plurality of remote units are synchronized at the central unit. A variety of novel modem arrangements and methods for coordinating communications between a plurality of remote units and a central unit to facilitate multi-point-to-point transmission are disclosed. The invention has application in a wide variety of data transmission schemes including Asymmetric Digital Subscriber Line systems that include the transmission of signals over twisted pair, fiber and/or hybrid telephone lines, cable systems that include the transmission of signals over a coaxial cable, and digital cellular television systems that include the transmission of radio signals.

In one embodiment, a discrete multi-tone data transmission system has a multiplicity of discrete subchannels including an overhead bus. In a method aspect, when a selected remote desires to initiate communications, it loop times its own clock with the clock of the central unit and then transmits a remote initiated synchronization signal to the central unit over a dedicated overhead subchannel or set of overhead subchannels in the overhead bus. The central unit responds with a centrally initiated synchronization signal that contains information indicative of a frame boundary phase shift required to better synchronize the selected first remote unit with other remote units that are currently communicating with the central unit. The remote responds by shifting the phase of the frames it outputs as indicated by the centrally initiated synchronization signal. The synchronization may be done in either an iterative manner or as a single step. This synchronizes the frame boundaries of the frames outputted by the selected remote unit with frame boundaries of frames output by the other remote units that are currently communicating with the central unit. The synchronization is arranged to occur such that the frame boundaries from the various remotes substantially coincide when they are received at the central unit.

In one embodiment of the invention the overhead bus includes two dedicated overhead subchannels and the remote initiated synchronization signal and the centrally initiated synchronization signal are transmitted over different overhead subchannels. In other embodiments a single or multiple dedicated overhead subchannels may be used. In some embodiments, the number of subchannels available to the selected remote unit for transmission of data to the central unit are dynamically allocated. Specific central and remote modem designs suitable for implementing such a system are also described.

In another aspect of the invention, synchronized quiet times are periodically provided in the upstream communication stream. The synchronized quiet times are used to handle a variety of overhead type functions such as initialization of new remote units, transmission channel quality checking and handling data transfer requests.

In one embodiment, a method of synchronizing frames transmitted from an initializing remote unit to the central unit with frames transmitted from other remote units to the central unit is described. In this embodiment, synchronized quiet times are periodically provided on the plurality of discrete sub-channels provided for upstream communications. When a remote unit is being initialized, it transmits a broad-band initialization signal to the central unit during a synchronized quiet time. The broad-band initialization signal includes a plurality of initialization signals transmitted over distinct sub-channels. In one preferred embodiment, the remote unit monitors downstream communication when it desires initialization and substantially synchronizes the frame boundary of the broad-band initialization signal with a frame timing marker carried in downstream signals received by the remote unit. The central unit receives the broad-band initialization signal and sends a synchronization signal back to the first remote unit. The synchronization signal includes information indicative of a frame boundary phase shift required to better synchronize frame boundaries of signals sent by the remote unit with frame boundaries of signals sent by other remote units that are in communication with the central unit. The remote unit then shifts the phase of the frames it outputs to facilitate synchronization.

The synchronized quiet time used in this embodiment has a period that is sufficiently long for a quiet period marker to be transmitted from the central unit to the remote unit that is furthest from the central unit, and an initialization signal returned from that furthest remote unit to the central unit all within the synchronized quiet time.

In another embodiment, a method of dynamically checking sub-carrier transmission quality from the remote units to the central unit is described. This facilitates the allocation of bandwidth to the remote units by the central unit. In this embodiment, training signals are transmitted from one of the remote units over the multiplicity of sub-channels provided for facilitating upstream communications during a selected synchronized quiet time. The training signals are monitored by the central unit which determines a set of channel characteristics indicative of the bit capacities of the various sub-channels to deliver signals from the selected remote. The central unit may then use the set of channel characteristics when determining which sub-channels to allocate to the selected remote unit for upstream communications.

In one preferred embodiment, the transmitting and monitoring steps may be repeated plurality of different remote units in order to determine channel characteristics for each of the different remote units. The different remote units are preferably arranged to transmit their respective training signals during different quiet times. The set of channel characteristics for each remote may be stored within a matrix of channel characteristics that contains information indicative of the channel capacities from each of the remote units to central unit. The channel characteristic information may then be used to facilitate the dynamic allocation of bandwidth to various remote units. In another preferred embodiment, the remote units only transmit their respective training signals in response to the reception of a retraining signal from the central unit. This facilitates control over the system.

In yet another embodiment of the invention, a method of informing the central unit of the transmission requirements of a remote unit is described. In this embodiment, a remote that wishes to initiate or change communications transmits a data request signal to the central unit at a time other than during a quiet time interval. The central unit then sends an authorization signal to the remote unit allocating a particular quiet time. The remote then transmits data request information over a plurality of the discrete sub-channels during the allocated quiet time. Knowing the remote unit's requirements, the central unit allocates one or more sub-channels to the remote unit in response to the data request information.

In one preferred embodiment, the data request signal may indicate either a desire to transmit at a particular data rate or a desire to transmit a particular amount of information. In the former case, the central unit allocates sufficient sub-channels to the remote unit to facilitate transmission at a requested data rate that is specified in the data request information. In the latter case, the central unit allocates one or more sub-channels for an amount of time sufficient to transmit an amount information that is specified in the data request information.

In another preferred embodiment, the remote unit may transmit a defined data packet request signal after the data request information has been defined and transmitted. When this occurs, the central unit immediately allocates at least one sub-channel to the selected first remote unit in direct response to the defined data packet request.

In another preferred embodiment, the remote units monitor information provided in the downstream communications stream prior to transmitting a data request signal and only transmit the data request signal over sub-channels that are reported as not in use. In still another preferred embodiment, a first value of the data request signal is indicative of a data rate request, a second value of the data request signal is indicative of a data packet request and a third value of the data request signal is indicative of a defined data packet request. In such an arrangement, the data request signal may be as small as a two bit signal.

In yet another embodiment, each frame of the discrete multi-tone signal includes a multiplicity of symbols and each remote unit is assigned an associated symbol during which it may transmit its data request symbol. In this embodiment, the central unit determines the identity of a particular remote unit transmitting a data request signal based at least in part upon the symbol during which the data request signal is received.

It should be appreciated that the various embodiments may be used either standing alone or in combination with one or more of the others. The various described quiet times need not be of the same length and typically, the quiet times described in conjunction with the third embodiment would be more frequent than the other two.

In still another embodiment, a fast access transmission mode is provided. In this embodiment, a communication access request that includes a unique remote unit identifier is transmitted from the requesting remote to the central unit. The request is transmitted on at least one unused sub-channel using a modulation scheme that does not require equalization to decode at the central unit. The central unit then allocates the appropriate sub-channels to the requesting remote unit.

In further aspects of the invention, discrete multi-point transmitters and receivers capable of implementing the various methods are described. It should be appreciated that the various embodiments may be used either standing alone or in combination with one or more of the others. The described systems may be used regardless of whether the downstream signals are also discrete multi-carrier. In several preferred embodiments, the bi-directional data transmission system is a cable system that includes the transmission of signals over a coaxial cable, although other systems are contemplated as well.

BRIEF DESCRIPTION OF THE DRAWINGS

The invention, together with further objects and advantages thereof, may best be understood by reference to the following description taken in conjunction with the accompanying drawings in which:

FIG. 10 is a flow diagram illustrating the steps taken by a requesting remote unit to establish communication with a central unit.

FIG. 11(a) is a flow diagram illustrating a method of allocating bandwidth to a remote unit making a data packet request.

FIG. 11(b) is a flow diagram illustrating a method of allocating bandwidth to a remote unit making a defined data packet request.

FIG. 11(c) is a flow diagram illustrating a method of allocating bandwidth to a remote unit making a data rate request.

DETAILED DESCRIPTION OF THE INVENTION

Discrete Multi-Tone (DMT) data transmission schemes have been shown to facilitate high performance data transmission. Among the benefits of DMT architectures is that they have high spectral efficiencies and can adaptively avoid various signal distortion and noise problems. Since they have very high data transmission capabilities, in most applications selection of a DMT data transmission scheme will provide plenty of room for the expansion of service as the demands on the data transmission system increase. Discrete Multi-tone technology has applications in a variety of data transmission environments. For example, the ATIS Asymmetric Digital Subscriber Line North (ADSL) American standard contemplates use of a Discrete Multi-Tone data transmission scheme.

A detailed description of the protocols for ATIS ADSL North American standard Discrete Multi-Tone (DMT) transmission scheme is described in detail in the above referenced ATIS contribution. The standardized system uses 256 "tones" which are each 4.3125 kHz wide in the forward (downstream) direction. The frequency range of the tones is from zero to 1.104 MHz. The lower 32 tones may also be used for duplexed data transmission in the upstream direction. Improvements in this system which contemplate increasing the transmission bandwidth by as much as an order of magnitude have been proposed in other applications by present invention. In other systems, the number of subchannels and/or the subchannel bandwidth used may be widely varied. However when IFFT modulation is done, typical values for the number of available subchannels are integer powers of two, as for example, 128, 256, 512, 1024 or 2048 subchannels.

As described in the background section of this application, one limitation of discrete multi-tone transmission systems is that in order to support a plurality of drop points serviced by a single line, the upstream signals must be synchronized when they arrive at the central unit. This synchronization problem has limited the attractiveness of Discrete Multi-tone (DMT) data transmission schemes in certain applications such as cable systems and wireless cellular television delivery since these systems use a single line (medium) to service a relatively large number of independent remote units, which would typically be operated by different subscribers.

Figure 1:
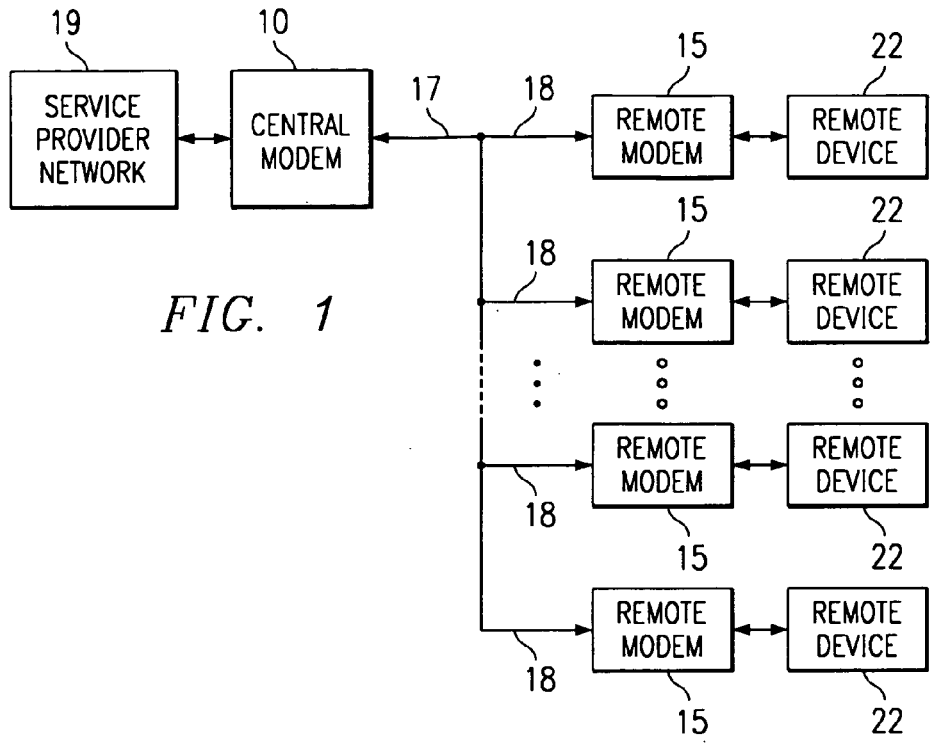
FIG. 1 is block diagram of a communication system including a head end central unit that services a plurality of remote units.

Referring initially to FIG. 1, a schematic transmission scheme for a typical multi-user subscriber network will be described. A central unit 10 (which includes a central modem) communicates with a plurality of remote units over a common transmission line 17 which is split into a plurality of feeds 18. Each feed 18 services an associated remote unit which typically includes a remote modem 15 which receives the signals and a remote device 22 which uses the data. A service provider 19 would typically be arranged to provide the data to the central modem for transmission to the remote modems 15 and to handle the data received by the central modem from the remote modems. The service provider 19 can take any suitable form. By way of example, the service provider can take the form of a network server. The network server can take the form of a dedicated computer or a distributed system. A variety of transmission media can be used as the transmission line. By way of example, twisted pair phone lines, coaxial cables, fiber lines and hybrids that incorporate two or more different media all work well. This approach also works well in wireless systems.

As will be appreciated by those skilled in the art, one requirement of discrete multi-tone data transmission systems such as those contemplated herein is that if two or more units (typically two remote units) are attempting to independently transmit information to a third unit (i.e. the central unit 10), the signals from the remote units must by synchronized or at least some of the signals will be incomprehensible to the central unit 10. The problem with using discrete multi-tone transmissions in such a system is that the length of the feeds 18 will typically vary from remote to remote. Therefore, even if the remotes synchronize with the clock of the central unit 10, their communications back to the central unit 10 will be phase shifted by an amount that is dependent at least in part on the length of the associated feed. In practice, these types of phase shifts can make remotely initiated communications unintelligible to the central modem.

Figure 2:
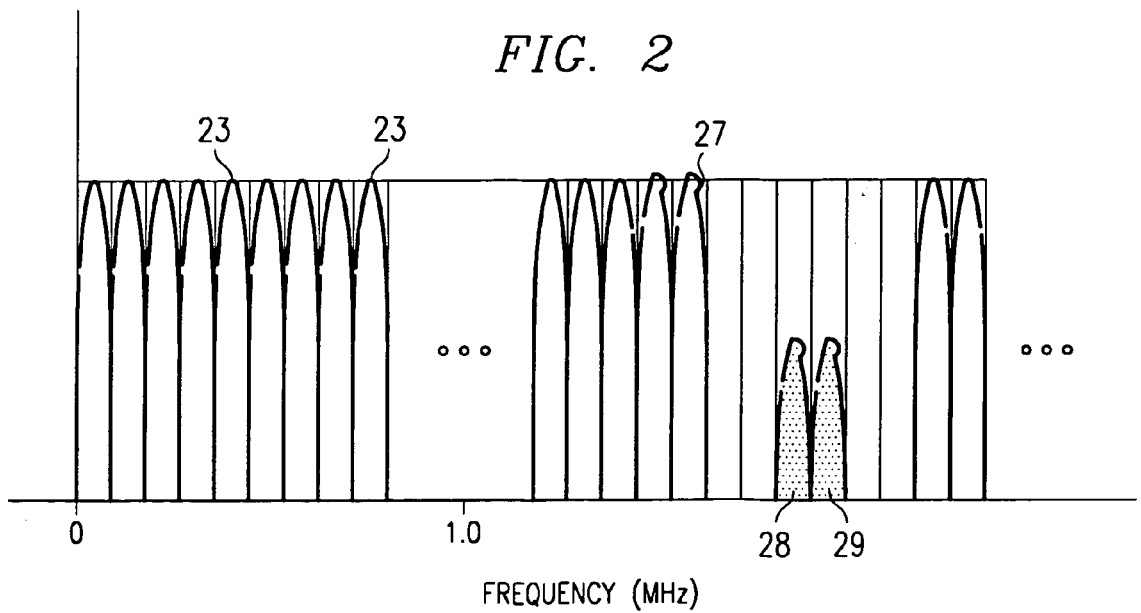
FIG. 2 is a frequency diagram illustrating the use of a multiplicity of delimited sub-channels used in a DMT system that includes a pair of dedicated overhead sub-channels.

A representative DMT transmission band is illustrated in FIG. 2. As seen therein, the transmission band includes a multiplicity of sub-channels 23 over which independent carrier signals (referred to as sub-carriers 27) may be transmitted. DMT transmission inherently partitions a transmission medium into a number of sub-channels 23 that each carry data independently. The data on each sub-channel 23 can correspond to a different signal or can be aggregated into higher data rates that represent a single or fewer wider-bandwidth transmissions. These sub-channels 23 are implemented entirely with digital signal processing in DMT, which eliminates the need for analog separation filters and maximizes spectral efficiency. The number of sub-channels used may be widely varied in accordance with the needs of a particular system. However, when modulation is performed using an Inverse Fast Fourier Transform (IFFT), typical values for the number of available sub-channels 23 are integer powers of two, as for example, 128, 256, 512, 1024 or 2048 sub-channels 23. By way of example, in one embodiment that is adapted for use in a cable based subscriber system, 1024 sub-carriers 27 may be used with each carrier confined to a 32 kHz sub-channel 23. This provides approximately 32 MHz of frequency bandwidth in which the remote units can communicate with the central unit 10.

The number of remote units that may be used in any particular system may vary greatly in accordance with the needs of a particular system. By way of example, in one embodiment of the described cable based subscriber system, it may be desirable to permit up to 500 remote units to communicate with a single central unit. In systems that contemplate such a large number of remote units, it may be desirable to allocate the remote units in groups. Of course, the groups need not each contain the same number of units. By way of example, a system that permits up to 500 remote units may divide the remote units into eight groups, with each group permitting up to 90 remote units, with each remote unit group being assigned a designated frequency band. For example, the frequency spectrum may be divided into a plurality of equally sized designated frequency bands. In the particular embodiment described, one-eighth of the 32 MHz, or approximately four megahertz would be assigned to each group. Therefore, each group would have about 4 MHz, and correspondingly, 128 sub-channels 23 to use for transmitting to the central unit 10. Grouping allows the central unit 10 to keep track of the remote units in a manageable manner as they come on and off line.

The groupings can be made using any number of methods. By way of example, a first group could consist of consecutive sub-channels 0–127, a second group sub-channels 128–255 and so forth. Alternatively, the allocation of sub-channels 23 to the respective groups may be interleaved throughout the spectrum. For example, the first group may be assigned sub-channels 0, 8, 16, 24, 32 . . . ; the second group may have sub-channels 1, 9, 17, 25, 33 . . . ; the third group: 2, 10, 18, 26, 34 . . . ; and so forth. The interleaving of sub-channels 23 assigned to the groups helps to reduce the probability that noise located in one particular area of the frequency spectrum will corrupt a significant portion of the transmissions in a single group. Instead, the spurious noise will affect only a portion of the spectrum for each group. As can be appreciated by those skilled in the art, the frequency bandwidth of the upstream channel, size of the sub-channels 23 and the groupings are not restricted to the numbers in the described embodiment but can be chosen to suit the needs of the particular use of the transmission system.

One method of addressing the synchronization problems pointed out above contemplates the use of dedicated overhead subchannels 28 and 29 (of FIG. 2) to facilitate synchronization. In this embodiment, upstream overhead subchannel 28 carries synchronization signals from the various remotes to the central modem. Downstream overhead subchannel 29 carries synchronization signals from the central modem to the various remotes. The overhead subchannels 28 and 29 may be located at any suitable frequency position within the transmission band. In many embodiments such as the asymmetric digital subscriber line system discussed above, it may be desirable to locate the overhead subchannels near either the upper or lower frequency edge of the downstream signal so as to minimize their interference with adjoining subchannels. When the system constraints permit, it may be further desirable to separate the overhead subchannels from other subchannels used for data transmission by at least one or two sub-channels in order to minimize potential interference caused by the synchronization signals. This is desirable since the synchronization signals will often be unsynchronized with other transmissions. Therefore, they will cause more distortion than other signals due to being out of synch. Accordingly, a small buffer is helpful. Along the same lines, it may also be desirable to use relatively low powered signals as the overhead subcarriers to further minimize interference issues in some cases.

Figure 7:
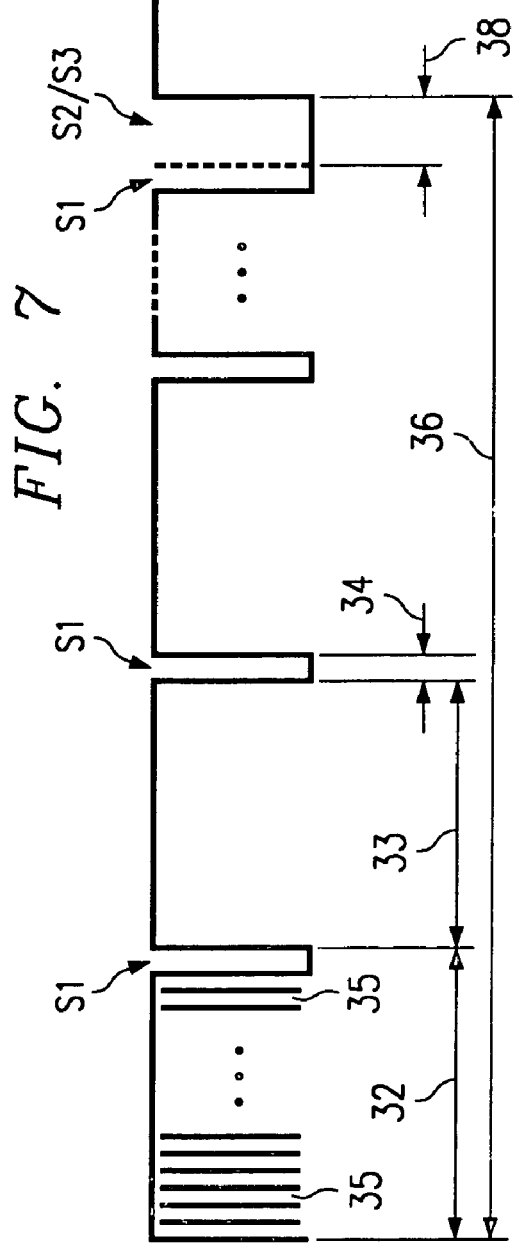
FIG. 7 is a timing diagram of a DMT data transmission system in accordance with one embodiment of the present invention.

As will be described in more detail below, in another aspect of the present invention, synchronized quiet times are periodically provided in the upstream communication stream. The synchronized quiet times may be used to handle a variety of overhead type functions such as initialization of new remote units, transmission channel quality checking and handling data transfer requests. Referring next to FIG. 7, a representative frame delimited transmission timing sequence is illustrated that provides a number of synchronized quiet periods that are suitable for handling the overhead functions. In the embodiment shown, the transmissions are broken up into string of transmission frames 32. Each transmission frame includes a transmission interval 33 and a first quiet interval S1. Each transmission interval 33 is further divided into a plurality of symbol periods 35 as shown. A plurality of transmission frames 32 are then grouped together into a super-frame 36. In addition to the transmission frames 32, each super-frame 36 also includes a second quiet time interval 38. In the embodiment described, the second quiet time interval 38 may be used as either an initialization interval (S2) or a retraining interval (S3).

The actual periods provided for the transmission interval 33, the quiet time interval S1, the initialization interval S2 and the retraining interval S3 may be widely varied in accordance with the needs of a particular system. Similarly, the number of transmission frames 32 in a super-frame 36 may be widely varied. By way of example, one suitable embodiment for use in the described cable-based subscriber system, contemplates a transmission interval 33 set to a period sufficient to transmit 63 symbols and the S1 time interval 34 set to one symbol in length of time. The initialization interval S2 may be used as an alternative arrangement for synchronizing the remote units. Thus, the length of the second quiet time interval 38 is typically determined by the physical aspects of the communications system, as will be discussed in more detail below. In general, the remote units are required not to broadcast during an S1 or S3 quiet time interval unless given permission by the central unit 10. In some embodiments, the remote units are also required not to broadcast during an S2 quiet time interval unless they are seeking to initiate installation as will be described in more detail below.

Figure 3:
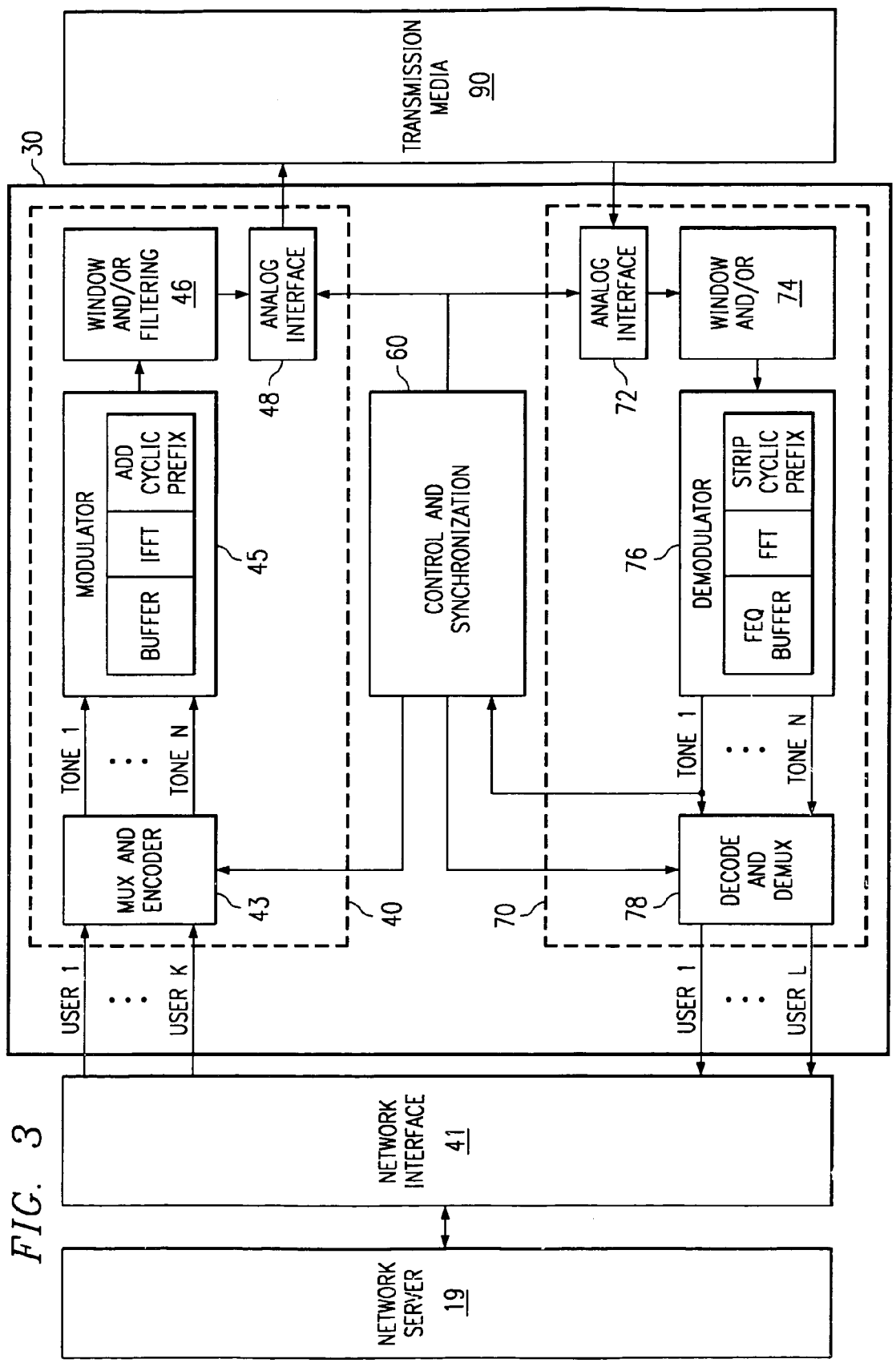
FIG. 3 is a block diagram of a central office modem architecture suitable for implementing the synchronization of the present invention.
Figure 4:
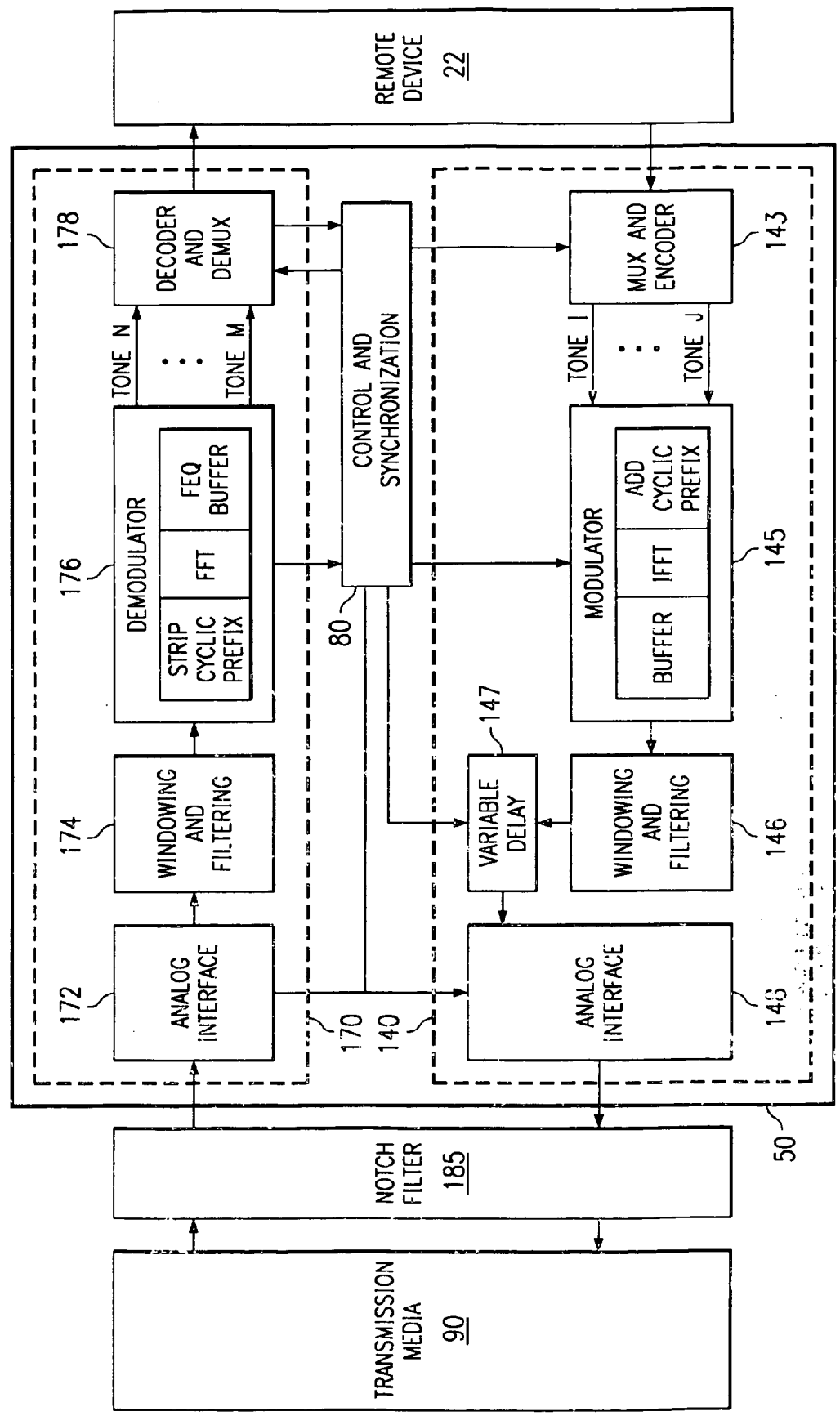
FIG. 4 is a block diagram of a remote unit modem architecture suitable for implementing the synchronization of the present invention.

Referring next primarily to FIGS. 2–4, the use of auxiliary overhead sub-channels to facilitate synchronization of newly added remotes will be described in more detail. Initially, the remote modem 50 includes a remote synchronization controller 80 that cooperates with a central controller 60 in the central modem unit. As briefly discussed above, in the described embodiment, two auxiliary overhead sub-channels are provided to facilitate communications between the controllers. When the remote modem 50 is initialized and desires to come on stream, its remote controller 80 observes downstream signal transmissions that inherently contain the central modem clock information. This is sometimes done by employing pilot signals although other schemes can be employed as well. The remote modem is then "loop-timed". That is, it phase locks its own clock with the clock of the central modem. The remote controller then sends a synchronization signal to the central unit 30 via overhead subchannel 28. The synchronization signal passes through the transmission media into the receiver portion of central modem unit 30. When the central modem 30 receives a remotely initiated (upstream) synchronization signal while it is currently in communication with other remote units, it compares the frame boundaries of the remotely initiated synchronization signal with the frame boundaries of signals being received from other remote units. Typically, there would be a phase shift between the frame boundaries that is detected by the controller 60. The controller 60 then generates a downstream synchronization signal that is transmitted back to the remote units via overhead subchannel 29.

In the embodiment described and shown, the controller 80 is responsible for generating the upstream synchronization signal when the remote modem desires to initiate communications with the central modem. The upstream synchronization signal is fed from the controller 80 to the multiplexer/encoder 143 and directed specifically towards upstream overhead subchannel 28. It should be appreciated that since the nature of the synchronization signal is known, it could be introduced to the transmitter at other locations as well or could even be applied directly to the analog interface 148. Typically, the synchronization signals and/or sequence would be the only signals transmitted by the remote until synchronization is complete. The upstream synchronization signal is then transmitted to the central modem via overhead subchannel 28 where it would be received by receiver 70. The receiver's demodulator 76 then feeds the demodulated synchronization signal to the central modem's controller 60. The central controller 60 detects the remotely initiated synchronization signal and compares its frame boundary to the frame boundaries of any signals that are simultaneously being received from other remote units. When the central modem 30 is in communication with other remotes, it is likely that the frame boundaries of the remote requesting access will be phase shifted from the frame boundaries of those that are already in communication with the central modem due to variations in the feed length. In such cases, the central controller 60 initiates a return (downstream) synchronization signal that indicates the phase shift (which takes the form of a time delay) required to align the frame boundaries. The return synchronization signal is then transmitted to the remotes via the second overhead subchannel 29. Like the upstream synchronization signal, the downstream synchronization signal may be introduced to the downstream data stream at the encoder.

The nature of the downstream synchronization signal may vary, however, by way of example, the synchronization signal may simply indicate that the remote should advance or retard the frame boundary by one sample. In a somewhat more complicated system, the controller can attempt to calculate the number of samples that the frame boundary must be advanced or retarded and a signal that dictates the number of samples that the frame boundary should be shifted can be sent. Other signal interpretations can be used as well. As will be discussed in more detail below, in many embodiments, the sample rate for upstream communications will be an integer factor of the sample rate of the downstream communications. The described delay is based on the sample rate of the central modem, as opposed to the remote.

Since a plurality of remotes are all connected to the same transmission line 17, the synchronization signal will be received by all the operating remote modems. The signal is then passed from each remote modem's decoder to their associated controller 80. However, the remote controllers 80 are arranged to ignore synchronization signals on the overhead subchannel unless they are currently trying to initiate communications with the central modem. This can be accomplished in a variety of ways. By way of example, the downstream synchronization signals may include an address directed at a specific remote. Alternatively, the remotes can simply assume that the central modem signal is directed at them if they are currently attempting to initiate communications. The remote controller 80 of the remote unit that is attempting to initiate communications receives and interprets the centrally initiated synchronization signal and instructs the frame synchronizer 147 to implement the requested phase shift timing delay (or advance). A second remotely initiated synchronization signal would then be sent. If the new synchronization signal is not in synch, the same process will be repeated. In one embodiment, the synchronization signal would merely instruct the frame synchronizer to advance or retard by one sample. It is contemplated that in most applications of DMT, such an incremental system will work well to quickly synchronize the remote unit. By way of example, in a system that has a symbol (frame) rate of 8 kHz (and thus a symbol period of 125 μs) which corresponds to 64 Kbps, with each frame having 128 samples plus a prefix, in distribution networks having feed length variations of as much as two miles, it would still take less than approximately ten milliseconds to synchronize using a simple single sample advance/retard approach.

When a remotely initiated signal is determined to be in synch, then the central controller would send a return synchronization signal over the second overhead sub-channel 29 indicating that no further phase shifting is required and that the remote unit may initiate full communications with the central modem incorporating the desired phase shifting. When the remote is synchronized before it is recognized by the central modem, the data tones transmitted just after initialization are used to identify the remote modem. It is expected that the relative phase shifting of frame boundaries is primarily dependent on fixed constraints such as the transmission length through the various feeds. Therefore, once a remote is synchronized, it does not need to be resynchronized unless the connection is terminated or broken.

It should be appreciated that when the central unit is not in communication with any other remote units at the time it receives a request to initiate communications, the central controller 60 would merely send back a synchronization signal indicating that no phase shifting was required and that full communications may begin. A similar signal would, of course, also be generated in the event that the requesting remote happens to be in synch with the other remote modems when it first attempts to initiate communications. When the remote modem receives such a signal, the same process may be followed with the required phase shift simply being zero.

Typically, the central controller 60 would also provide information indicative of the subchannels that the remote unit should utilize for its transmissions, etc. As mentioned above, the subchannel allocation can be dynamically changed during use. Although this feature is important to the discrete multi-tone transmission scheme is not particularly germane to the present invention and therefore will not be described only briefly, although it is described in detail in the cited references.

Figure 5:
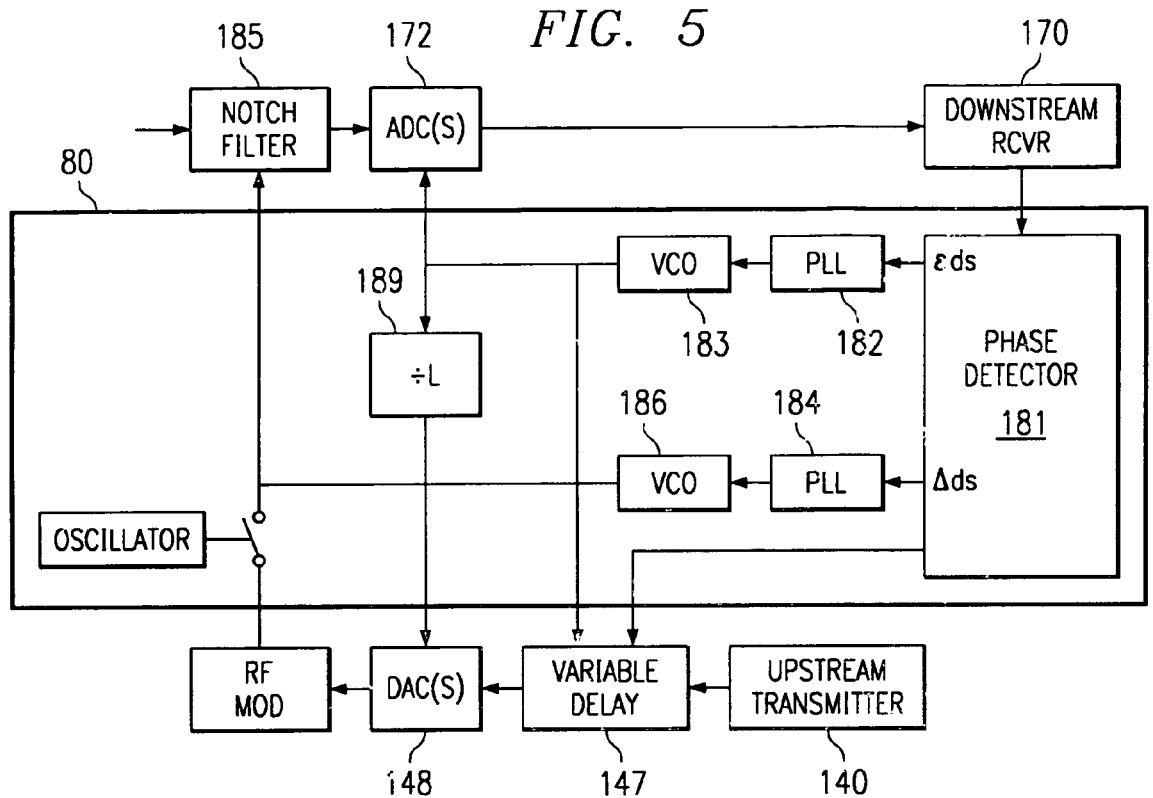
FIG. 5 is a block diagram illustrating a remote unit synchronization arrangement suitable for implementing synchronization and upstream symbol alignment.
Figure 6:
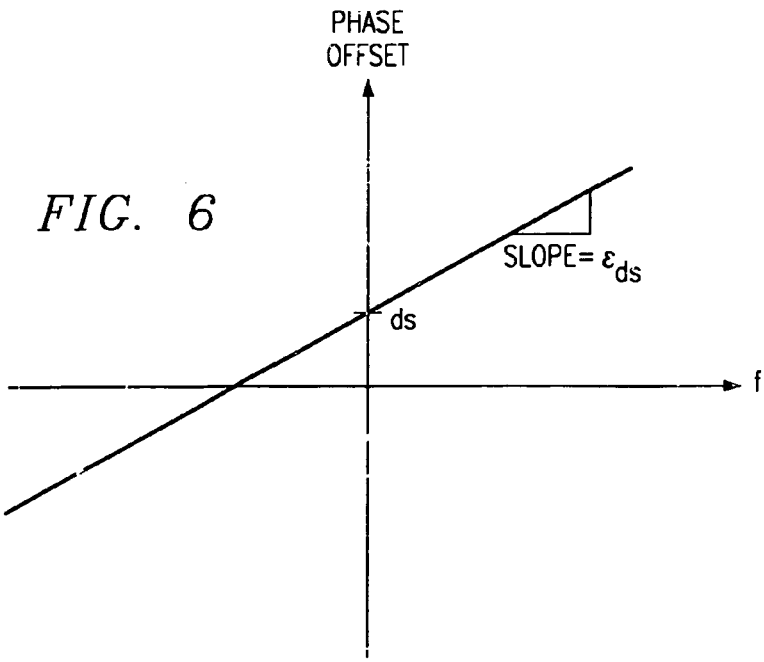
FIG. 6 is a graph illustrating phase error versus frequency. The slope is proportional to the timing error and the y-intercept is proportional to phase error of the carrier.

Synchronization of a remote modem to the central modem requires the acquisition of the central modem's sampling clock and carrier. In one preferred embodiment, these clocks are recovered by inspecting the phase errors for at least two tones. The phase error for these tones can be computed with respect to a fixed known transmitted phase on the tones (i.e. "pilot" tones). Alternatively, they may be determined by assuming decisions on the transmitted phases are correct and computing the offset between the pre- and post-decision phases (i.e., decision-aided phase-error computation). The slope of the phase error plot; as illustrated in FIG. 6, is proportional to the timing-phase error, while the constant part (the y-intercept) of the phase-error plot is the carrier-phase error. The timing (sampling) phase error and the carrier-phase error are determined by phase detector 181 and input to phase-lock loops 182, 184 that synthesize a sampling clock and carrier frequency at the recovered central modem frequencies as illustrated in FIG. 5. The carrier is used to demodulate the downstream signal to baseband and the sampling clock is (after division by divider 189) used to clock the analog-to-digital converter(s) (ADC). If the data tones and the signal tones occupy separated tones, then more then one analog-to-digital converter at slower sampling clocks may be used in place of a single higher-speed ADC clock. In embodiments that include the notch filter 185, voltage controlled oscillators 183, 186 are provided to control the location of the notch.

The same sampling clock (after division by divider 189) is used for upstream digital to analog converters. The upstream carrier may be synchronized to the downstream carrier or may not be so synchronized. When it is not synchronized, the central modem's upstream receiver will need to recover the upstream transmission carrier phase, otherwise the central modem's upstream receiver can use a rational phase-locked multiple of the downstream carrier for data recovery. Wideband remote modems would preferably use a sampling clock that is the same as the sampling clock in the central modem. These remote modems will not divide the recovered sampling clock. Narrow band remote modems that receive only a few tones will use a sample clock that is an integer divisor of the recovered sampling clock. Accordingly, narrow band remote modems can be less costly to implement.

The DMT symbols transmitted upstream from the remote modems must arrive at the central modem at the same time as discussed above, even when they are generated by different remote modems. Therefore, the delay synchronizer 147 inserts an integer number of sample-clocks delay into the upstream transmitted signals. This delay is programmed under control of the downstream synchronization signal as previously discussed. Again, it should be appreciated that the delay is based on the sample rate of the central modem, as opposed to the remote. Specifically, as illustrated in FIG. 5, the sample rate of the remote may be an integer factor of the sample rate of the central. However, the signals must be synchronized at the central modem and therefore, the synchronization adjustments must be made on the basis of the central modem's sample rate.

In the event that two remotes simultaneously attempt to initiate communications with the central modem, a conflict will occur and the central controller 60 will likely be confused by the upstream sychronization signals. In such a case, its downstream synchronization signal would indicate an improper phase shift and the confirmation synchronization signals would not be properly synchronized. In one embodiment, the central controller 60 could recognize the problem and instruct the remote units to stop and attempt to establish communications at a later point. In another embodiment, the central controller could simply send another downstream synchronization signal indicative of the additional phase shifting that is required. In either event, the remote unit will quickly recognize that a problem exists and assume that a conflict is occurring. In this situation, a suitable conflict resolution scheme can be employed. One simple conflict resolution scheme is simply to have each remote delay for a random amount of time and attempt to reinitiate communications after the random delay. As long as the delay is determined in a manner that the remotes are not likely to consistently follow the same delay pattern, their requests will eventually be separated sufficiently such that each can be brought on line independently. A variety of wait-time distributions may be utilized. By way of example, a Poisson distribution has been found to work well.

It should be appreciated that the described IFFT modulation scheme works extremely well for systems that are arranged to transmit relatively large chunks of data and therefore require more than a handful of tones. However, in many situations, the remotes may not need to transmit large blocks of data regularly. In such situations, it may be cost effective to utilize a simpler conventional modulation scheme for transmitting information from the remotes to the central unit. In such circumstances, the remote transmitter and the central receiver would both be replaced with the appropriate components. However, there would still be a need to synchronize the remotes as discussed above.

In operation, the central modem transmits an aggregate DMT signal that uses all (or the usable) tones in a manner such that each remote knows the tones that it is to receive and the number of bits allocated on each of its received tones. The remotes modems, in turn each use only a subset of the available upstream tones. The signals transmitted from the central modem to the remotes may be used to dynamically allocate the tones available to a particular receiver. Alternatively, in a static system, the allocation could be made in the downstream synchronization signal. Dynamic allocation can take place on either another dedicated overhead or control channel or may be multiplexed with other non-control signals. In the described system, the upstream signals are timed so that they arrive at the central modem at substantially the same time. Precise alignment is not necessary; however, the system works best when the boundaries are closely aligned in terms of the sample rate of the central modem.

Figure 8:
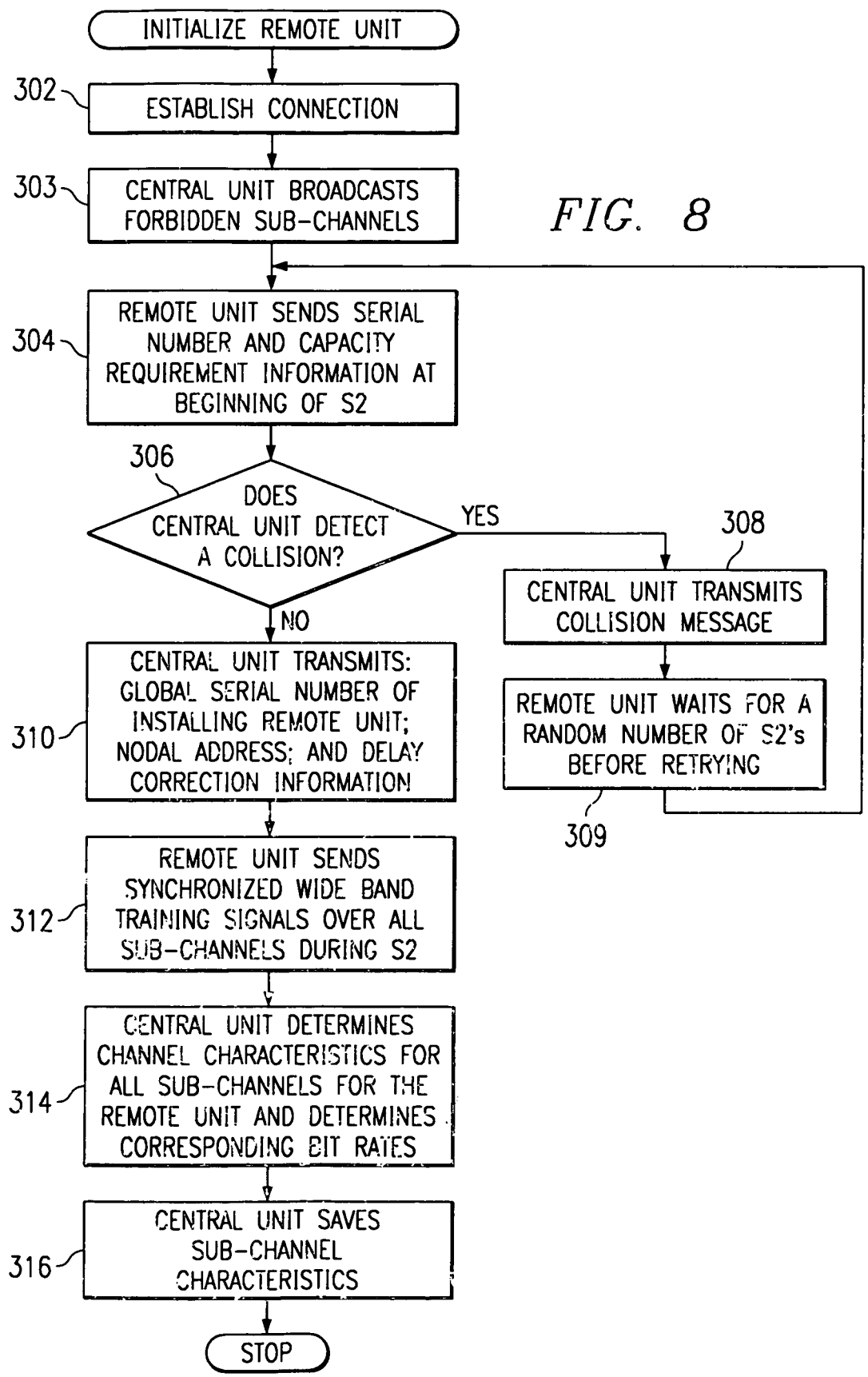
FIG. 8 is a flow diagram illustrating a method of initializing a remote unit in accordance with one aspect of the present invention.

Referring next to FIG. 8, an alternative method of initializing a first remote unit during installation that utilizes the described second quiet times S2 in accordance with another aspect of the invention will be described. As discussed above, when a remote unit first comes on line, it must be initialized such that the transmissions from the first remote unit arriving at the central modem are synchronized with the transmissions of any other currently installed remote units. That is, the frame boundaries of upstream DMT communications from the various remote units to the central unit must be substantially synchronized at the central unit for the transmissions to be understood by the central unit. The method described with reference to FIG. 8 is one method of accomplishing such synchronization utilizing the described quiet times.

Initially, the remote unit to be installed must establish a connection to the transmission network in step 302. The connection enables the remote unit to listen to the downstream transmissions from the central unit 10 and transmit on any unused sub-channel 23 of the upstream channel. In some systems, there may be certain frequency ranges that the system may not use. By way of example, in many cable networks there may be established systems that utilize specific frequency bands. In order to prevent interference and maintain backward compatibility, it is important that the remote unit never transmit in the forbidden frequency range, even during initialization. Of course, certain frequency bands may be forbidden for other reasons as well. Accordingly, in step 303, the central unit will periodically broadcast an identification of frequencies that may never be used. In systems that utilize the concept of remote unit groups as discussed above, the central unit may also periodically broadcast the group number of the group that should be used by the next remote unit to be installed. Alternatively, the group assignment can be handled at a later point.

The newly connected remote unit listens to the downstream signals for information indicating that certain sub-channels may not be used. The downstream signal also includes the frame timing and quiet period markers required to synchronize the remote unit with the central unit. After the remote unit has synchronized itself with the downstream signal, in step 304 it transmits an initialization signal at the beginning of an S2 quiet period. In one system, this is done by transmitting an initialization signal immediately upon receiving an S2 quiet period marker signal. The initialization signal indicates to the central unit 10 that a remote unit requests to be installed onto the system. The remote unit may determine the onset of an S2 initialization quiet period in any suitable manner. By way of example, a flag may be provided by the central unit 10 in the downstream communications. The remote unit may transmit its initialization signal over all the sub-channels 23, over a group of sub-channels 23 or on a single sub-channel 23 depending on the needs of a particular system. In a preferred embodiment, the downstream signal indicates the group to be used by the next unit to be installed, and the initialization signal is transmitted over all the sub-channels in that group.

The upstream initialization transmissions from the remote units to the central unit 10 can be accomplished in any modulation scheme suitable for transmitting digital information. By way of example, amplitude, frequency, and quadrature phase shift key (QPSK) modulation schemes can be utilized. For the synchronization signal, differential QPSK (DQPSK) modulation is desired in a preferred embodiment to decrease the possibility of corruption by noise. Additionally, the synchronization can be encoded with a large amount of error correction and redundancy to ensure coherent communications.

The initialization signal preferably contains information about the remote unit. In a preferred embodiment the initialization signal carries the global address of the remote unit and the maximum transmission data rate requirement of the first remote unit. A global address is similar to addresses used on ethernet or cellular devices. Such addresses are built into the communications device and are distinct from addresses of all other communicating devices. The maximum data rate required by the remote unit is dependent upon the type of device the remote unit is. For example if the remote unit is a television set it would require minimal communications capacity to the central unit 10, possibly only using the upstream signals to send information about movie selections or viewer feedback. On the other hand, if the remote unit is a teleconferencing transceiver then a large amount of bandwidth would be required to transmit video and audio information from the remote unit to the central unit 10. Other pieces of relevant information about the first remote unit can also be sent along with the initialization signal in other embodiments.

Upon receiving the initialization signal from the first remote unit, the central, unit 10 determines in step 306 whether the initialization signal from the first remote unit has collided with another initialization signal from another remote unit trying to connect at the same time. If a collision is detected then the central unit 10 transmits a collision message back to the remotes in step 308. The collision message indicates to the remote units trying to connect to try again. The colliding remote units then each wait a random number of S2 periods before re-sending an initialization signal. The probability of two remote units trying to initialize at the same time is small. By requiring the colliding units to wait random amounts of time that are independent of each other, the probability of repeat collisions is reduced even further.

After the central unit 10 receives a valid initialization signal from the first remote unit, the central unit 10 transmits a synchronization signal 310 back to the remote unit. In one embodiment, the synchronization signal includes the global address of the first remote unit, a nodal address assigned to the first remote address, delay correction information, and information about the allocation of the sub-channels 23 in the upstream channel. Either the global address and the nodal address can serve as a unique remote unit identifier, albeit with differing degrees of transmission efficiency. The global address allows the first remote unit to identify that the synchronization signal is intended for it. The nodal address is assigned to the first remote unit in order to facilitate efficient future communications. The global address can be quite long (as for example 48 bits) to allow for an adequate number of global addresses for all the communicating devices that are likely to be manufactured. The nodal address is a shorter address since only a limited number of remote units will be communicating with any single central unit 10. When a multi-grouped system is used, the nodal address also contains group identifier information, e.g. information about the group to which the first remote unit is assigned. In the embodiment described above which contemplates a total of eight groups, that part of the address would be three bits to identify which of the eight groups the first remote unit is in. The remainder of the bits can uniquely identify the node, e.g. the specific remote unit, within its group.

It should be appreciated by those skilled in the art that the part of the nodal address that specifies the group, i.e. the group identifier information, may be omitted altogether when a remote unit needs to uniquely identify itself to the central unit. This is because the central unit may, by inspecting the frequency band of the unique identifier message, determine the group from which the remote unit's message is sent. In this manner, a remote unit needs to send only the bit pattern in the nodal address that identifies itself in the group, i.e. the unique intra-group identifier information, in order to uniquely identify itself to the central unit. This received intra-group identifier bit pattern, in combination with the ascertained group identifier information, provides the central unit with the complete nodal address of the requesting remote unit. In the preferred embodiment which has 128 sub-channels per group, the unique remote identifier information may be as short as 7 bits in the upstream direction.

The delay correction information tells the first remote unit how much the frames being broadcast from the first remote unit must be delayed in order to synchronize them with signals from the other connected remote units. The delay correction is determined from the amount of delay that the central unit detects between the time it transmits a quiet period (S2) marker and its reception of the initialization signal. By way of example, if the maximum delay in the channel is $T_{RT}(Max)$, e.g. maximum round-trip delay, and the delay associated with a given remote unit is $T_{RT}(i)$, the delay correction for that remote unit is $T_{RT}(Max)-T_{RT}(i)$. The round-trip delay for a remote unit is defined as the time taken for a signal to travel from the central unit to that remote unit, and an immediate response to be returned to the central unit, including any minimal, incidental delay attributable to processing. Using this information the first remote unit can adjust its transmissions and become synchronized with the other connected remote units, such that the frames of the remote units arrive at the central unit 10 at the same time. The first remote unit may also learn which sub-channels 23 are currently in use by the other connected remote units. In another embodiment, information about sub-channel 23 characteristics are regularly transmitted to all the remote units through the downstream channel. In such systems, channel usage information would not be required to be sent along with the synchronization signal.

One advantage of transmitting the initialization signals over a broad portion of the available spectrum is that delays may vary to some extend depending upon the frequency at which the signal is transmitted. Therefore, when the initialization signals are transmitted over a variety of the sub-channels 23 the required phase shift can be calculated based on an average of the individual delays.

The length of the S2 time interval, as discussed earlier, is dependent upon the physical nature of the communications network. In a preferred embodiment the S2 time interval need only be longer than the duration of the initialization signal plus the difference between the maximum and minimum round-trip delays for the network. By way of example, in a typical system employing a fiber optic trunk as the transmission line 17 and coaxial cables as the feeds 18, the fiber trunk is common to all paths between central and remote units, and the difference between the maximum and minimum round-trip delays for the network depends only on the cable part of the network. Using the length of 2 miles for the coaxial line and given its propagation time of approximately 7.5 microseconds per mile, the maximum and minimum round-trip delays would be approximately 32 and 2 microseconds. In a preferred embodiment a symbol is approximately 30 microseconds long, and an initialization signal would comprise two symbols, so that, by way of example, an S2 time interval of 4 symbols would be appropriate.

In certain embodiments, it may be desirable to repeat steps 304–310 to validate the information received and/or ensure that the remote is properly synchronized.

After synchronization has been accomplished, the first remote unit responds by sending a set of synchronized wide band training signals over all the sub-channels 23 during the next available S2 or S3 time interval in step 312. The specifics of the training step will be described in more detail below with reference to FIG. 9. In some embodiments, the central unit 10 will direct the first remote unit to use a specified S3 time interval (e.g., wait for the third S3). Upon receipt of the training signals, the central unit 10 determines the capacities of the various sub-channels 23 to handle transmission between the first remote unit and the central unit 10 (step 314). The central unit 10 preferably has a prior knowledge of the contents of the training signals. This allows the central unit 10 to learn the optimal equalization of the sub-channels 23 and also the maximum bit rates a sub-carrier 27 can carry on the sub-channels 23 between the first remote unit and the central unit 10. The central unit 10 saves the channel characteristics of the sub-channels 23 with respect to the first remote unit 316. In a preferred embodiment the central unit 10 saves the information in a bits/carrier matrix that contains an indication of the number of bits that each of the sub-channels 23 can carry from each of the remote units. Such a matrix allows the central unit 10 to keep track of the capacity of each of the various sub-channels 23 and is available when allocating bandwidth to the remote units. This also facilitates the dynamic allocation of sub-channels based upon the current characteristics of the transmission environment.

Figure 9:
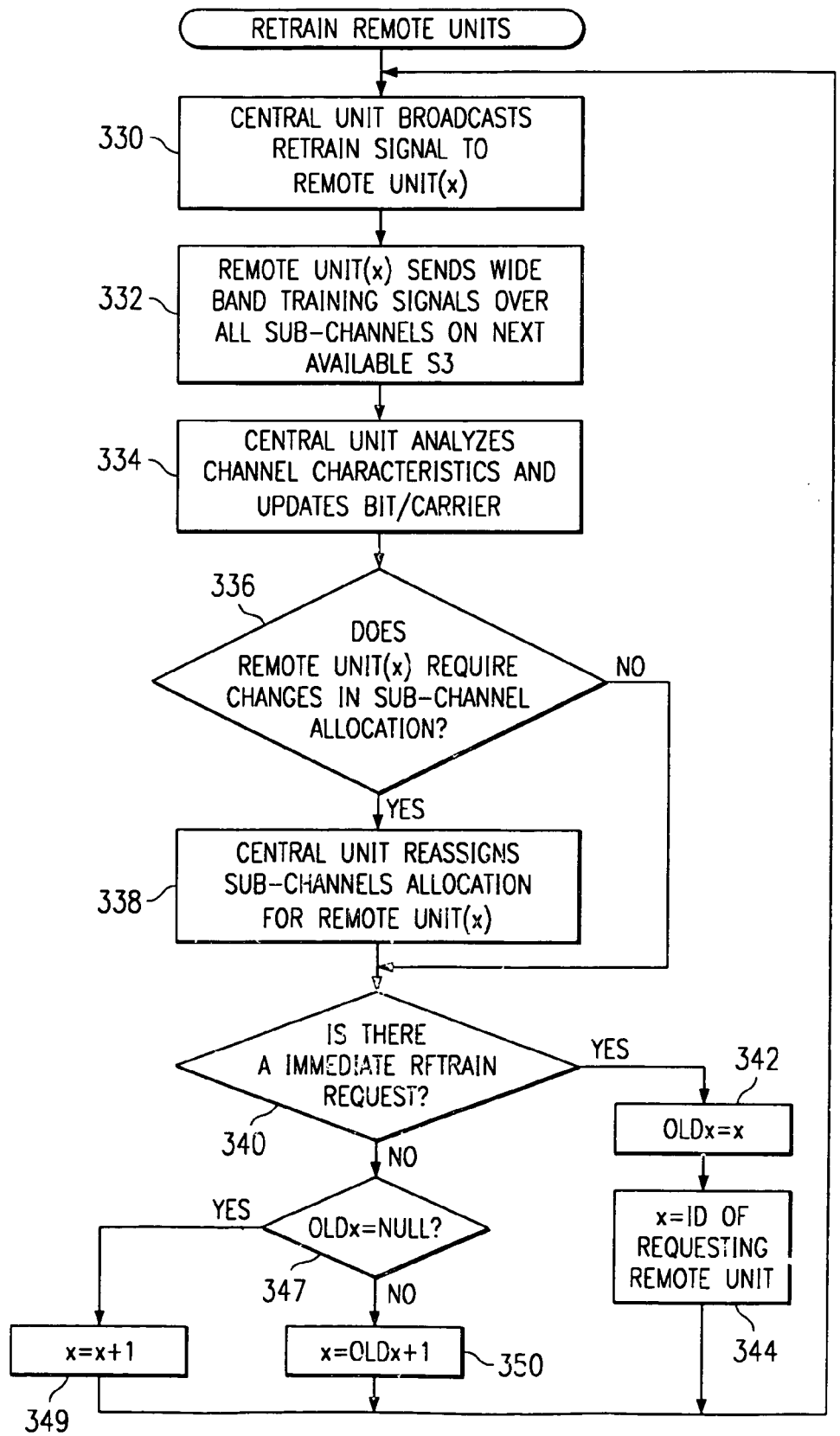
FIG. 9 is a flow diagram illustrating a method of retraining a remote unit in accordance with a second aspect of the present invention.

Referring next to FIG. 9, a method of periodically checking the capacity of the various sub-channels from a selected remote unit to the central unit will be described. As will be appreciated by those skilled in the art, the capacity of the transmission line at various frequencies may vary somewhat over time. Therefore, it is desirable to periodically update the central unit's information concerning the characteristics of the sub-channels 23 with respect to each of the remote units it services. In the embodiment described, such updating is done during the S3 quiet periods. In the embodiment shown, the S3 quiet periods are of the same length as the S2 quiet periods. It should be appreciated that a single transmission line checking process may be used both for the initial training and the periodic checking.

In the described embodiment, the central unit 10 initiates a retraining event in step 330 by transmitting a retraining command to a first remote unit (remote unit x) that is in current communication with the central unit 10. The first remote unit waits for the next available S3 retraining quiet time interval to transmit a set of training signals over the available sub-channels 23. (Step 332). In an alternative embodiment, the central unit 10 may assign a specific S3 quiet interval to use for transmitting the training signals, instead of the next available S3 time interval. The set of training signals will typically be limited to the sub-channels allocated to the group and will typically be further limited to some subset of the total available group sub-channels to provide a cost effective design. Therefore, the number of training signals that are actually used may be widely varied in accordance with the needs of a particular system. As in the initialization process, the central unit 10 analyzes the signals it receives and updates the bit/carrier rates in the channel characteristics matrix that correspond to the associated remote unit. (Step 334). The central unit 10 then determines whether a change in the sub-channel allocation is necessary for the remote unit. That is, it may determine whether additional or fewer sub-channels 23 should be allocated to the first remote unit in order to meet the first remote unit's throughput and error probability requirements. If a change is necessary, then the central unit 10 re-allocates sub-channels 23 to the first remote unit in step 338.

If it is determined that no correction is required in step 336 or after any necessary changes have been made in step 338, the central unit 10 checks to see if there have been any requests made by any other remote units for an immediate retraining in step 340. If it is determined in step 340 that there are no immediate retraining requests, the central unit 10 checks to see if the retraining of the first remote unit was a result of a immediate retraining request by checking if there is a valid old address (oldx) in step 347. If there is no valid old address then the central unit 10 increments the counter (x) in step 349 and returns to step 330 where it broadcasts a retrain signal to the next remote unit. On the other hand, if it is determined in step 340 that there was a valid old address, the central unit 10 will adjust the counter such that it reads one more than the old address, which corresponds to the address of the remote unit that would have been next at the time an immediate retrain request was received. (Step 350). That is, x=oldx+1.

If an immediate retrain request was detected in step 340, then the central unit 10 saves the address of the first remote unit as an old address (oldx) in step 342. The central unit 10 then sets the counter (x) to the address of the requesting remote unit and uses it as the address of the next remote unit currently being retrained 344. The logic then returns to step 330. The retraining process may then be continually repeated among all the remote units currently communicating with the central unit 10. Of course, the algorithm used to select the remote units for retraining may be widely varied to meet the requirements of any particular system.

In one embodiment, the remote units that have been initialized but are not currently communicating with the central unit 10 are also retrained. In that case, the central unit 10 need not determine if the allocation of sub-channels 23 has to be changed for the remote unit being retrained since it is not actively communicating with the central unit 10. The central unit 10 can merely save the updated channel characteristics to be used when the remote unit requests communication with the central unit 10.

The central unit 10 is preferably adapted to receive a retraining request on unused sub-channels 23 during a transmission time interval 32. In a preferred embodiment, the transmission time interval 32 is 64 symbols long, corresponding to the maximum number of possible remote units within a group. A remote unit requiring an immediate retraining transmits a flag during one of the symbol times assigned to the requesting remote unit in the transmission time interval 32. In this manner, the central unit 10 can immediately determine which remote unit sent the request by the location of the flag. For example, remote units 0–63 in group eight may be assigned symbols 0–63 respectively in the transmission time interval. If a flag arrives on an unused sub-channel 23 in the group eight frequency band during the ninth symbol position, then the central unit 10 knows that the ninth remote unit in group eight has sent a retraining request. As can be appreciated by those skilled in the art, the assignment of remote units to symbols can be accomplished in many different ways.

As discussed above, in order to facilitate a dynamically allocated discrete multi-tone transmission scheme, there must be some mechanism by which the remote units can communicate a data transmission request to the central unit. In one embodiment, the S1 quiet times are used in conjunction with a data transmission-request to facilitate initiation of a transmission. In the described embodiment, a remote unit may send three types of data requests to the central unit. They include a data packet request (DPR), a defined data packet request (DDPR) and a data rate request (DRR). As used in this embodiment, a data packet request indicates the remote unit's desire to transmit a specific volume of information (which is typically defined in terms of a number of data bytes). A defined data packet request indicates the remote unit's desire to transmit a packet or group of packets having characteristics already known to the central unit. By way of example, the central unit may already have stored in its memory the information regarding the remote unit to which data packets from the requesting remote unit should be sent. Other information known to the central unit may include, for example, the required transmission rate for the data packets, the number of sub-channels needed by the requesting remote unit, and the like. A data rate request indicates the remote unit's desire to transmit data at a particular rate.

The described data transmission requests may, in one embodiment, be coupled with the immediate retrain request described above in a simple two bit signal that includes four states. By way of example, one state (1,1) may correspond to a Data Rate Request; a second state (1,0) may correspond to a Data Packet Request, a third state (0,1) may correspond to an immediate retrain request, and a fourth state (0,0) may correspond to a Defined Data Packet Request. Of course, the same information can be included as part of a larger signal and/or the meaning of the various states may be varied. As described above, the two bit data transmission request signal may be transmitted by a remote unit over sub-channels that are not in use. By assigning a particular symbol period to each remote unit, the central unit can readily identify the requesting remote unit without requiring any independent identification information in the data transmission request signal. This transmission mode, which assigns a particular symbol period to each remote unit, is termed the polled transmission mode.

As will be appreciated by those skilled in the art, in addition to merely identifying the type of information the remote unit wishes to transmit, in the case of both the Data Rate Request and the Data Packet Request, the remote will normally need to provide substantially more information to the central unit in order for the central unit to properly handle the request. In order to provide quick access times, the extra information is relayed to the central units during the next available S1 quiet time interval. More specifically, when the central unit 10 receives a valid data packet request or a valid data rate request, the central unit 10 directs the requesting remote unit to transmit any additional information about the requesting remote unit's request during the next available S1 quiet period 34. During the S1 quiet period, the requesting remote unit has access to as many sub-channels as it needs to transfer the header information. Since both the Data Rate Request and the Data Packet Request effectively request only the allocation of an S1 quiet period, they could readily share a single state in the two bit data transmission request signal. Accordingly, in alternative embodiments, a single state could be provided to indicate the desire for allocation of a S1 quiet period and the nature of the request could be transmitted during the S1 period along with the other information.

When the system is not being heavily used, there may be a relatively large number of sub-channels that are available to the remote unit when it sends its data transmission request. During such periods, it may be possible to transmit all of the required header information concurrent with the transmission of the data request in the same symbol period. Thus, in one alternative embodiment, the free state in the data transmission request may be used to flag to the central unit that the remote unit is transmitting the required header information on unused sub-channels simultaneously with the data transmission request. In the polled transmission mode, the timing of the data transmission request would identify the remote unit sending the request. Thus, the advantage of this approach is that during times of relatively light usage, the access times for data rate and data packet requests may be even further reduced. Conflicts would not occur between two remote units since each remote only transmits during its assigned symbol period. When the remote unit determines that there is not enough bandwidth to accept all of the required header information in the assigned symbol period, it would simply request allocation of an S1 quiet period as described above.

In another embodiment, the central unit 10 can assign a specific S1 interval 34 for the requesting remote unit to use. This is especially useful when two or more remote units make data packet or data rate requests between two S1 intervals.

As noted earlier, when the system is not being heavily used, there may exist a relatively large number of sub-channels that are unused and available to a remote unit for requesting access. When the central unit determines that usage in the system is light, say when usage falls below a predefined usage threshold, the central unit may issue a command to all remote units to enable remote units to transmit their communication access requests to the central unit using a fast access transmission mode. Fast access transmission mode differs from the above described polled transmission mode in which each remote unit is assigned to a symbol period for the purpose of transmitting its data transmission request signal. As the name implies, fast access transmission mode substantially improves a requesting remote unit's access speed by permitting a requesting remote unit to transmit a communication access request on one of the unused or unallocated sub-channels during any symbol period, regardless whether that symbol period has been assigned to it. The remote units know which sub-channels are unused because, for example, the central unit monitors sub-channel usage and broadcasts information regarding sub-channel usage from time to time to all remote units.

Because a remote unit no longer has to wait until its assigned symbol period to assert a communication access request, it can assert its communication access request as soon as need arises. On the other hand, the timing of the request in the fast access transmission mode does not furnish information regarding the identity of the requesting remote unit. To identify which remote unit asserts a received communication access request signal, fast access transmission mode therefore requires that each requesting remote unit sends a unique remote unit identifier upon requesting access. As mentioned earlier, the unique remote unit identifier may be as few as 7 bits for systems having 128 sub-channels per group.

In one embodiment, the communication access request signal includes a data transmission request. As mentioned previously, the data transmission request identifies the type of data request, e.g. DPR, DDPR, or DRR, desired by the remote unit. If two bits are used for identifying a data transmission request, the last state may be used to indicate whether the header data is simultaneously sent in the same symbol period or during the following S1 period. Obviously if the data request is DDPR, there may be no header information since the central unit may already know the transmission requirements, e.g. the destination of the data packet, the packet size, the priority rating, and the like, associated with a particular remote unit. If the data request is DPR or DRR, the last state defined by the two-bit data transmission request is examined by the central unit to determine when header information is sent.

In another embodiment, the communication access request further includes the header information for DRR and DPR data requests. The inclusion of the header information increases the number of bits sent in the fast access transmission mode. When the number of bits increases, the chance for a collision increases. Collisions occur when two remote units simultaneously assert their communication access requests on the same unused sub-channel. Consequently, the preferred embodiment preferably keeps the number of bits sent in the fast access transmission mode as low as possible in order to minimize collisions. As is apparent, the fast access transmission mode is most suitable for DDPR data requests since it is not necessary to send header information from the remote unit to the central unit.

Therefore, a communication access request preferably includes only the remote unit's unique remote unit identifier and the two-bit data transmission request. In one embodiment, however, if a communication access request does not include the two-bit data transmission request, the central unit may assume that a DDPR data request is desired and proceed to allocate sub-channels to the requesting remote unit based on the stored data packet defining information associated with that remote unit.

Fast access transmission mode preferably requires that the communication access request be transmitted from the remote unit to the central unit using a modulation method that does not require equalization during decoding. Equalization is necessary in certain modulation schemes that require the central unit to know about the characteristics of the sub-channel and the remote unit, e.g. the absolute amplitude of the received signal and the phase in order to decode incoming data. Obviously, when a communication access request arrives at the central unit during fast access transmission mode, the central unit does not know prior to decoding the identity of the requesting remote unit. This is because in fast access transmission mode, a remote unit may assert its communication access request during any symbol period, and the timing of the request does not furnish information regarding the identity of the requesting remote unit.

Since the identity of the requesting remote unit is not known prior to decoding, the communication access request cannot be decoded by modulation methods that require prior knowledge of the sub-channel and the remote unit identity, e.g. QAM. In one embodiment, the present invention advantageously encodes a remote unit's communication access request using Differential Quadrature Phase Shift Keying (DQPSK). When DQPSK is used, the information regarding a communication access request is stored in the differences in phase instead of in the absolute phase. Further, it is possible to choose an appropriate constellation such that the amplitude is irrelevant. In this manner, a communication access request may be received and decoded by the central unit without requiring prior knowledge of the identity of the requesting remote unit.

As mentioned earlier, fast access transmission mode does not require the requesting remote unit to wait until its assigned symbol period to request access. Consequently, the access time may be as low as the time it takes to send the communication access request plus the time it takes for the central unit to send to the requesting remote unit information allocating sub-channels for use by the requesting remote unit.

In one embodiment, fast access transmission mode is enabled by the central unit when system usage is light, e.g. below a predefined usage threshold. Enabling fast access transmission mode during these times reduces the chance of collisions since there are more unused sub-channels on which one or more remote units may assert communication access requests. If a collision occurs, the central unit receives garbled data, e.g. data that cannot be decoded. Without knowing which remote unit requires access, the central unit therefore cannot allocate sub-channels to the appropriate requesting remote unit. In this case, a requesting remote unit may wait for a predefined time period after asserting its communication access request and if no allocation occurs, it then retransmits the communication access request, preferably after waiting a random time period to reduce the probability of another collision. In one embodiment, if the central unit receives a garbled data transmission on any unallocated or unused sub-channel, it assumes that a collision between two or more communication access requests has occurred and broadcasts to all remote units a "collision detected" message to urge the remote units to resend its communication access requests, preferably after waiting a random time period.

As is apparent, when there is a large number of collisions, sub-channel usage may increase because of the resending activities by the remote units and, in one embodiment, the broadcast activity of the central unit. If too many collisions occur, system usage may exceed the predefined usage threshold, causing the central unit in one embodiment to issue a control command to all remote units to cease data transmission in the fast access transmission mode and to resume data transmission in the polled transmission mode, in which each remote unit only transmits its data requests during its assigned symbol period.

FIG. 10 is a flow diagram illustrating the steps taken by a requesting remote unit to establish communication with a central unit. Referring now to FIG. 10, after starting in step 360, the method proceeds to step 362 where the requesting remote unit ascertains whether the transmission mode is fast access or polled. If the requesting remote unit ascertains that the polled transmission mode is currently operative, e.g. responsive to a control signal from the central unit when system usage is heavy, the method proceeds to step 366 to transmit data in the polled transmission mode. In the polled transmission mode, the requesting remote unit only transmits its data request during its assigned symbol period on one or more unused sub-channels.

On the other hand, if the requesting remote unit ascertains that the fast access transmission mode is currently operative, e.g. responsive to a control signal from the central unit when system usage is light, the method proceeds from step 362 to step 364 to transmit its communication access request on one or more unused sub-channels during any symbol period. As explained earlier, the requesting remote unit does not have to wait until its assigned symbol period to transmit its communication access request in the fast access transmission mode.

From either step 364 or 366, the method proceeds to step 368 to determine whether the data request is a data packet request (DPR). If it is, the method proceeds to step 370 where the steps of FIG. 11(*a*) are executed. On the other hand, if the data request is not a DPR (as determined in step 368), the method proceeds to step 372 to determine whether the data request is a defined data packet request (DDPR). If the data is request is a DDPR, the method proceeds to step 374 where the steps of FIG. 11(*b*) are executed. On the other hand, if the data request is not a DDPR (as determined in step 372), the method proceeds to step 376 to determine whether the data request is a data rate request (DRR). If the data request is a DRR, the method proceeds to step 378 where the steps of FIG. 11(*c*) are executed. If the data request is none of the above, the method proceeds to step 380 where the steps of FIG. 10 ends. It should be appreciated that certain embodiments may include additional data request types and that the method may be adapted to proceed to handle those additional data requests as appropriate. The adaptation of the disclosed method to handle specific additional data request types are within the abilities of one skilled in the art given this disclosure.

Referring to FIG. 11(*a*) a method of handling a data packet request will be described in more detail. Initially, the central unit 10 allocates the next available S1 time interval 34 to the requesting remote unit and forwards a message verifying the allocation with the downstream signal (Step 204). Then in step 206, the requesting remote unit transmits the additional information during the allocated S1 time interval 34. By way of example, the additional transmission requirements may include the address to which the data is being sent, the packet size, and a priority rating. As discussed earlier, the remote unit may alternatively transmit the additional transmission requirements in the same symbol period as the transmission request.

The central unit 10 then stores the additional data packet information that it receives in step 208. The central unit 10 then determines the number of sub-channels that should be allocated for the remote units requests and transmits instruction as to the sub-channels that are to be used together with the allowable bit rates per channel back to the requesting remote unit. It should be appreciated that the central unit 10 will allocate sub-channels 23 based upon the stored set of channel characteristics that correspond to the requesting remote unit 210. In this manner the central unit 10 can dynamically allocate the most efficient number of sub-channels 23 to handle the remote unit's request. It should be appreciated that the central unit receiver knows the amount of data to be transmitted (from the information received during the S1 quiet period), as well as the data transmission rates (which the remote unit has specified). Therefore, the central unit knows the amount of time that is needed to complete the transmission. Accordingly, the central unit 10 allocates the designated number of sub-channels 23 to the requesting remote unit only for the amount of time required for the requesting remote unit to transmits its packet(s). After the specified amount of time has elapsed (with any necessary buffer), the central unit 10 makes note that the sub-channels 23 assigned to the first remote unit are now unused and ready to be reallocated to any other remote unit. (Step 212).

Referring next to FIG. 11(*b*), a method of handling a defined data packet request (DDPR) will be described. In a defined data packet request, the central unit must rely on the additional data packet defining information that was stored in step 208. Again, this may include such things as the address to which the packet(s) is being sent and the packet size. Thus, in the described embodiment, a defined data packet request can be handled only if it is transmitted by a remote unit that has previously sent a DPR. In alternative embodiments, appropriate defaults could be provided to permit the use of defined data packets even when no data packet request has been sent.

As illustrated in FIG. 11(*b*), in step 223, the central unit looks up the stored defined data packet transmission requirements and uses that information in directing and/or handling the data packet(s) received. It should be appreciated that the central unit 10 does not need to receive any additional information either in the same symbol period or during an S1 time interval 34 and therefore can immediately allocate one or more sub-channels 23 to the requesting remote unit in step 225. Again, since the amount of information to be transmitted and the data transmission rates are both known, the central unit only allocates the sub-channels for the amount of time necessary to transmit the package. After the appropriate transmission time has elapsed, the central unit 10 notes that the sub-channels 23 are now free to be re-allocated in 227.

While many communicating devices can effectively communicate through packetized communications, others require a constant rate of transmission that is sometimes difficult to obtain using packetized transmission systems. Such remote units can be accommodated by allocating a number of sub-channels 23 that is sufficient for handling the required data transmission rate for an indeterminate amount of time. That is, until the remote unit indicates that the bandwidth is no longer required or an error is detected. By way of example, video conferencing is likely to have such requirements. In the described embodiment, this type of data transmission request is handled through the use of a data rate request.

Referring next to FIG. 11(*c*), a method suitable for handling data rate requests will be described. The central unit 10 will typically require additional transmission information such as address and the requested data rates upon receiving a DRR request. Accordingly, in step 252, the central unit allocates the next available S1 quiet period to the requesting remote unit to send the required information. The requesting remote unit then sends the additional transmission information during the allocated S1 time interval in step 254. As discussed earlier, the remote unit may alternatively transmit the additional transmission requirements in the same symbol period as the transmission request.

Knowing the data rate requirements as well as the permissible bit rates for each sub-carrier, the central unit 10 allocates an appropriate number of sub-channels 23 to handle the requested throughput in step 256. When the requesting remote unit no longer needs to transmit, it sends a new data rate request indicating that zero capacity is required in step 258. The central unit 10 understands this as a termination request and marks the appropriate sub-channels as unused in step 260.

There is no set period that is ideal for repeating the S1 quiet periods. On the one hand, the more frequent the S1 quiet periods, the shorter the access times that can be achieved for the polled transmission mode or for DPR and DRR requests will be. Thus, the more responsive the system will be. On the other hand, more frequent S1 quiet periods require more overhead which reduces overall system capacity. Thus, the appropriate frequency of the S1 periods will vary somewhat in accordance with the needs of any particular system. In the embodiment shown, the S1 quiet periods are used to delimit the frames, although it should be appreciated that this is not a requirement. In general, the use of the S1 quiet periods will reduce the access time required to initiate a communication. When appropriate, the use of DDPRs can further reduce the access time of the requesting remote unit.

As described above, initialization time intervals, S2, and retraining time intervals, S3, are not as numerous as the S1 quiet periods because initialization and retraining usually do not demand as rapid a response as a request for immediate communications. In one embodiment, S2's and S3's alternate every other super-frame 36. In yet another embodiment, S2's and S3's can be allocated dynamically by the central unit 10 to adjust for changing circumstances. By way of example, more of the reserved time intervals 38 can be allocated as initialization time intervals at times when remote units are more likely to be installed and require initialization, such as during the day. During the evening when installations are less likely, more of the reserved intervals 38 can be allocated as retraining time intervals.

Referring next to FIG. 3, a central office architecture suitable for implementing the described synchronization and coordination will be described. The central unit in the illustrated embodiment includes a central modem 30, a network server 19, and a network interface 41. The central modem includes a transmitter 40, a receiver 70, and a controller 60. The controller 60 is used to synchronize the clocks of the remote modems with the clock in the central modem, as well as synchronize frames transmitted from the remote modems. The network server 19 provides digital data to the transmitter 40 through an asynchronous transfer modem switch 41 (labeled network interface in the drawings). The network server 19 can provide data at any data rate up to the maximum data rate permitted in view of the transmitter's capability, the transmission distance, the transmission line quality and the type of communications line used. The transmitter 40 incorporates several components including an encoder 43, a discrete multi-tone modulator 45 and a windowing filter 46. The encoder 43 serves to multiplex, synchronize and encode the data to be transferred (such as video data). More specifically, it translates incoming bit streams into in phase and quadrature components for each of a multiplicity of subchannels. The encoding may be done using forward error correction and/or trellis coding. The encoder would typically be arranged to output a number of subsymbol sequences that are equal to the number of subchannels available to the system. By way of example, in a system having 256 subchannels, the encoder would output 256 subsymbol sequences. In the above-referenced ATIS standard, the subsymbol sequences would each represent 4 Kbps. These inputs are complex inputs that are passed to a discrete multi-tone modulator 45. By way of example, a suitable encoder is described in detail in the referenced ATIS standard.

The modulator 45 is an IFFT modulator that computes the inverse Fourier transform by any suitable algorithm. A suitable IFFT encoder is described in J. Bingham's article entitled: "Multicarrier Modulation: An Idea Whose Time Has Come," IEEE Communication Magazine, May 1990. Since the encoder outputs are complex numbers, the IFFT modulator receives twice as many inputs as there are subchannels available. The bit distribution is determined adaptively in discrete multi-tone systems. To facilitate this, the transmitter 40 also includes a line monitor that monitors the communication line to determine the line quality of each of the available subchannels. In one embodiment, the line monitor (which may be part of the controller 60) determines the noise level, single gain and phase shift on each of the subchannels. It is this line monitor that will typically be used to identify the quality of the described S3 retraining signals. The object is to estimate the signal-to-noise ratio for each of the subchannels. Therefore, other parameters could be monitored as well or in place of the parameters described. The determination of which subchannels to transmit the encoded data over as well as how much data to transmit over each subchannel is dynamically determined on the basis of several factors. The factors include the detected line quality parameters, subchannel gain parameters, a permissible power mask, and the desired maximum subcarrier bit-error rates. It is noted that the various factors need not be constant between subchannels and indeed may even vary during use. Most notably, the line quality parameters may be repeatedly checked and adjustments in the modulation scheme are made in real time to dynamically adjust the modulation as the line quality over various subchannels changes during use. By way of example, a suitable discrete multi-tone modulator is generically described in the same AUS standard document.

After the encoded signal has been modulated to form a discrete multi-tone signal, a cyclic prefix is appended to the discrete multi-tone encoded signal. The cyclic prefix is used primarily to simplify the demodulation of the discrete multi-tone signals and is not strictly required. In the ATIS standard, a 32-bit cyclic prefix is used. However, in systems that utilize larger bandwidths, it would be preferable to increase the length of the cyclic prefix as well. By way of example, in a signal having 512 samples, a 40 sample cyclic prefix has been found to work well.

The modulated signal is then passed through a windowing filter 46 and/or other filters in order to minimize the out of band energy. This is desirable to help prevent the analog interfaces in the remote receivers from saturating. The windowing can be accomplished by a wide variety of conventional windowing protocols. The transmitter also includes an analog interface 48 which applies the discrete multi-tone signal to the transmission media. In hardwired systems such as twisted pair phone lines and coaxial cables, the analog interface may take the form of a line driver.

The central modem 30 also includes a receiver 70 for receiving multi-tone signals from the remote units. The receiver 70 includes an analog interface 72, a windowing filter 74, a demodulator 76, and a decoder 78. Signals received by the central modem 30 are initially received through the analog filter 72. The windowing filter 74 is arranged effectively perform windowing and/or filtering functions on the received signal. One suitable filter arrangement is a time domain equalizer 74. Again, the windowing can be accomplished by a wide variety of conventional windowing protocols. The demodulator 76 demodulates the equalized discrete multi-tone signal and strips the cyclic prefix. The decoder 78 decodes the demodulated signal. The demodulator 76 and the decoder 78 effectively perform inverse functions of the modulator 45 and encoder 43, respectively. The decoded signal is then passed from the decoder 78 to the networks server 19 or other appropriate user of the information through the interface 41. The functions of the time domain equalizer 74, the demodulator 76 and the decoder 78, as well as algorithms suitable for accomplishing the desired functions are all described in more detail in Chow et al.'s U.S. Pat. No. 5,285,474.

Referring next to FIG. 4, a remote unit architecture suitable for implementing the synchronization of the present invention will be described. In many respects the remote modem will be similar to the central modem although its respective upstream and downstream communications capacities may be somewhat different. A signal transmitted by the central modem 30 is received by a remote unit 50 through an analog filter 172. The remote unit 50 includes the analog interface 172, a time domain equalizer (TEQ) 174, a demodulator 176 that demodulates the equalized discrete multi-tone signal and strips the cyclic prefix, and a decoder 178 that decodes the demodulated signal. The time domain equalizer 174 effectively performs a filtering functions on the received signal. A windowing filter may also be employed. The demodulator 176 and the decoder 178 perform inverse functions of the modulator 45 and encoder 43, respectively. The decoded signal is then passed from the decoder 178 to a remote device 22 such as a television, a computer, or other suitable receiving apparatus. The functions of the time domain equalizer 174, the demodulator 176 and the decoder 178, are similar to the functions of the corresponding components in the central modem. A notch filter 185 may optionally be provided at a location upstream of the receiver's analog filter 172 in order to block energy in frequency bands outside of the subchannels that are of interest to the remote unit. This can help prevent the analog filter from saturating. By providing a notch analog or other suitable filtering mechanism for filtering out of band energy, lower cost receiver components can be used since it is not necessary for the receiver itself to handle as much energy.

The upstream encoding and modulation may be done in exactly the same manner as the downstream data transmission described above in the discussion of the central modem unit. Thus, the remote modem 50 will also include an encoder 143, a multi-tone modulator 145, a window or filter 146, and an analog interface 148. It also requires a frame synchronizer 147 to time delay the multi-tone signals an amount suitable to synchronize the remote modem 50 with other remotes that are currently in communication with the central modem as described above. In subscriber type applications, a smaller number of subchannels are typically made available to facilitate upstream communications. However, it should be appreciated that any number of subchannels could be made available for such upstream communications.

If polled transmission mode is in effect, encoder 143 may represent, for example, a QAM encoder. By way of example, a 16-point constellation QAM encoder works well in many systems. If transmission is via fast access transmission mode, encoder 143 may represent, for example, a four-point constellation Differential Quadrature Phase Shift Keying (DQPSK) encoder. By way of example, a suitable DQPSK encoder is described in J. Bingham's text entitled "Theory and Practice of Modem Design" published by J. Wiley & Sons (1988). In the described mode switching example, the control signal to effect switching between the polled transmission and fast access transmission modes is also inputted to the encoder, although it should be appreciated that it could alternatively be added at other locations as well. Similarly, when the polled transmission mode is in effect, the decoder 78 at the central unit may represent, for example, a QAM decoder. If transmission is via the fast access transmission mode, the central unit decoder 78 may represent, for example, a Differential Quadrature Phase Shift Keying (DQPSK) decoder.

Most of the embodiments described above have been primarily directed at the manipulation of upstream communications from the remote units to the central unit 10. Thus, no restrictions are placed upon the type of downstream communications applicable to such a system. The downstream channel can utilize discrete multi-tone modulation similar to the modulation used for upstream communication, or it may utilize other suitable techniques, such as vesigial sideband (VSB) or QAM. Also, the downstream channel can be further comprised of dedicated overhead channels for transmitting the relevant formatting signals, such as, but not limited to: S1, S2 and S3 flags, synchronization signals, and information about the allocation of the sub-channels 23. As appreciated by those skilled in the art, numerous other methods of transmission schemes can be applied to the downstream channel in relation to the present invention.

When discrete multi-tone transmission is used in both the upstream and downstream data directions and the desired data transmission rates are relatively high, it may be desirable to incorporate a time division multiple access (i.e. "ping pong") based data transmission scheme. That is, downstream communications are given a designated number of frames or super frames to transmit over the entire bandwidth. Thereafter, upstream communications are given a designated number of frames or superframes to transmit over the entire bandwidth. In many applications high data rate applications such as 25.6 and 51.2 million bits per second applications, use of the ping pong based transmission scheme will provide substantial cost savings in the transmitter and receiver designs since it eliminates the need to provide costly filters for isolating simultaneous upstream and downstream communications. The ping pong approach is particularly advantageous at data rates above ten million bits per second.

Figure 12:
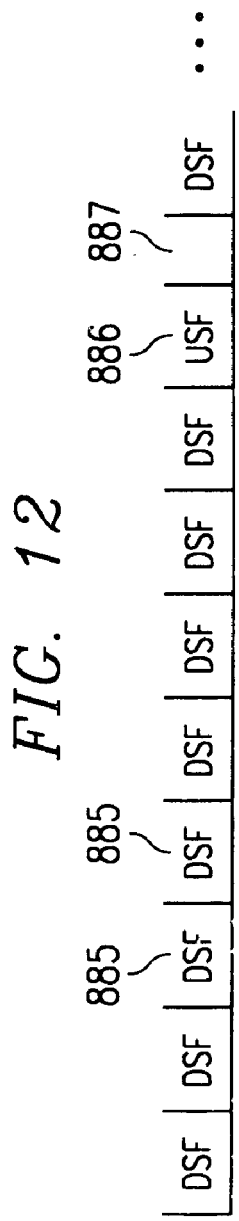
FIG. 12 is a graph illustrating a frame transmission sequence in a time division multiple access based data transmission scheme.

Referring next to FIG. 12, a ping pong based transmission scheme for an asymmetric application will be described. In this embodiment, eight consecutive downstream superframes (DSF) 885 of data are transmitted in the downstream direction and then one upstream superframe (USF) 886 of data is transmitted in the upstream direction. In other embodiments, the actual number of frames used to transmit in each direction can be altered in accordance with the needs of a particular system. By way of example, the asymmetric ratio could be widely varied in favor of the downstream communications, the transmission periods could be symmetric or the upstream communications could be given greater access. In systems that warrant the dynamic allocation of bandwidth between the upstream and downstream communications, a controller may also be provided to dynamically allocate the distribution of frames between the upstream and downstream communications. In systems in which the signals between the central unit and the remote units travel over relatively large distances, it may be desirable to provide a settling period 887 after the end of the data transmission in one direction in order to allow transients to settle. In the embodiment shown, a settling period is provided after the upstream transmission, but not after the downstream transmission. In practice, the settling period 887 may be appropriate following transmission in either or both directions.

It should be appreciated that the remote unit initialization and/or synchronization, the upstream subchannel access requests and/or training intervals may be accomplished using any of the techniques discussed above. The primary advantage of the described time division multiple access approach is that it does not require expensive filters for isolating simultaneous upstream and downstream communications in systems where the transmission bandwidth is likely to be taxed. Another advantage is that when compared to standard frequency-division multiplexing, wherein the upstream transmission are made in a first frequency range and the downstream transmissions are made in a second frequency range, the ping-pong transmission approach can improve asymmetric transmission. Indeed, the transmission rates can be increased almost to the level of a system that employs echo cancellation. However, the ping pong approach can achieve these transmission rates at a much lower analog component cost (using today's technology) than would be required to employ either a frequency division system or an echo cancellation system.

Although only a few embodiments of the present invention have been described in detail, it should be understood that the present invention may be embodied in many other specific forms without departing from the spirit or scope of the invention. For example, the invention has been described primarily in the context of a discrete multi-tone transmission system. However, it should be appreciated that the same techniques can be applied to other discrete multi-carrier systems as well, such as discrete wavelet multi-tone, vector coding and other multi-carrier modulation schemes. It should also be appreciated that in embodiments that incorporate the overhead subchannels, such subchannels can be shared or distinct in each direction. The use of two sub-channels in the overhead bus has been described in most detail. However, it should be appreciated that a single sub-channel could be provided for both upstream and downstream communications (particularly if echo cancellation is used). Alternatively, more than two overhead sub-channels may be provided if the constraints of a particular system dictated that more than one sub-channel should be used for communications in either (or both) directions. For example, in a system having a relatively small number of remotes, each remote (or sub-group of remotes) could be assigned a dedicated subchannel. Alternatively, redundancy could be provided to reduce the risk of noise based interference. The same could apply to downstream overhead communications. The drawback of using dedicated subchannels for each remote is, of course, that it is wasteful of bandwidth. Further, dedicated overhead sub-channels are described. However, it would be possible to multiplex other overhead information (such as control information) on the same sub-channel in some circumstances. In view of the foregoing, it should be apparent that the present examples are to be considered as illustrative and not restrictive, and the invention is not to be limited to the details given herein, but may be modified within the scope of the appended claims.

The invention claimed is:

1. In a bi-directional data transmission system that facilitates communications between a plurality of remote units and a central unit using a frame based discrete multi-carrier transmission scheme that has a multiplicity of discrete sub-channels provided for facilitating upstream communications between the plurality of remote units and the central unit, a method of informing the central unit of the transmission requirements of a remote unit, the method comprising the steps of: transmitting a data transmission request signal from a selected first remote to the central unit during a particular symbol in a data frame that is associated with the selected first remote unit on at least one sub-channel that are not otherwise in use by any of the remote units; transmitting data request information from the selected first remote to the central unit simultaneously with the data-transmission request signal over a plurality of the discrete sub-channels that are not in use; and allocating at least one sub-channel to the selected first remote unit in response to the data request information for facilitating upstream communications between the first remote unit and the central unit.

2. In a bi-directional data transmission system that facilitates communications between a plurality of remote units and a central unit using a frame based discrete multi-carrier transmission scheme that has a multiplicity of discrete sub-channels provided for facilitating upstream communications between the plurality of remote units and the central unit, a method of informing the central unit of the transmission requirements of a remote unit, the method comprising the steps of: transmitting a data transmission request from a selected first remote to the central unit, wherein the data transmission request indicates whether a particular data rate is requested or whether a designated amount of information is desired to be transmitted; allocating at least one sub-channel to the selected first remote unit in response to the data transmission request for facilitating upstream communications between the first remote unit and the central unit, wherein when a particular data rate is requested, the central unit allocates sufficient sub-channels to the selected first remote unit such that the selected first remote unit can transmit at the requested data rate and wherein the designated amount of information is desired to be transmitted, the central unit allocates the at least one sub-channel to the selected first remote unit for an amount of time sufficient to transmit the designated amount information.

3. In a bi-directional data transmission system that facilitates communications between a plurality of remote units and a central unit using a frame based discrete multi-carrier transmission scheme that has a multiplicity of discrete sub-channels provided for facilitating upstream communications between the plurality of remote units and the central unit and downstream communications between the central unit and the plurality of remotes, a method of transmitting data comprising the steps of:

a) transmitting a first number of frames comprised of at least one frame of downstream data from the central unit to at least one of the remote units using a discrete multi-tone modulation scheme, wherein no upstream data transmissions are permitted during the transmission period of the downstream data;

b) transmitting a second number of frames comprised of at least one frame of upstream data from at least one of the remote units to the central unit using a discrete multi-tone modulation scheme, wherein no downstream data transmissions are permitted during the transmission period of the upstream data;

c) sequentially repeating steps (a) and (b); and d) altering the first and second numbers of frames to vary an asymmetry ratio of the transmission periods of the downstream and upstream data and e) then seqiuentially repeating steps (a) and (b).

4. A method as recited in claim 3 further comprising the step of providing a settling period alter the transmission of at least one of the downstream frames and the upstream frame, wherein no transmissions are made in either direction during the settling period.

5. A method as recited in claim 3 or 4 wherein step (a) transmits the downstream data at a data transmission rate of at least ten million bits per second.

* * * * *